United States Patent
Higaki et al.

(10) Patent No.: US 10,554,137 B2
(45) Date of Patent: Feb. 4, 2020

(54) DC/DC CONVERTER

(71) Applicant: Mitsubishi Electric Corporation, Chiyoda-ku (JP)

(72) Inventors: Yusuke Higaki, Chiyoda-ku (JP); Ryota Kondo, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/300,683

(22) PCT Filed: Feb. 6, 2017

(86) PCT No.: PCT/JP2017/004193
§ 371 (c)(1),
(2) Date: Nov. 12, 2018

(87) PCT Pub. No.: WO2018/016106
PCT Pub. Date: Jan. 25, 2018

(65) Prior Publication Data
US 2019/0288606 A1  Sep. 19, 2019

(30) Foreign Application Priority Data
Jul. 19, 2016 (JP) ................... 2016-141026

(51) Int. Cl.
*H02M 3/335* (2006.01)
*H02J 7/00* (2006.01)
(Continued)

(52) U.S. Cl.
CPC ....... *H02M 3/33584* (2013.01); *H02J 7/0054* (2013.01); *H02J 7/0068* (2013.01);
(Continued)

(58) Field of Classification Search
CPC .... H02J 7/0054; H02J 7/0068; H02J 7/53806; H02J 7/53871; H02J 7/48; H02J 7/5395;
(Continued)

(56) References Cited

U.S. PATENT DOCUMENTS 7,638,904 B2 * 12/2009 Shoji ................. H02M 1/34
307/154
9,065,341 B2 * 6/2015 Murakami ........ H02M 3/33507
(Continued)

FOREIGN PATENT DOCUMENTS

WO   WO 2015/004825 A1   1/2015

OTHER PUBLICATIONS

International Search Report dated Mar. 14, 2017 in PCT/JP2017/004193 filed Feb. 6, 2017.

*Primary Examiner* — Adolf D Berhane
*Assistant Examiner* — Nusrat Quddus
(74) *Attorney, Agent, or Firm* — Oblon, McClelland, Maier & Neustadt, L.L.P.

(57) ABSTRACT

A DC/DC converter enabling a step-up operation and a step-down operation in a bidirectional power transmission, and capable of adjusting transmission power amount with a good response. A DC/DC converter decreases a first phase shift amount and increases a second phase shift amount, as a first transmission power amount increases, when a first transmission power amount is larger than a first reference point.

7 Claims, 12 Drawing Sheets

(51) Int. Cl.
*H02M 3/28* (2006.01)
*H02M 1/00* (2006.01)

(52) U.S. Cl.
CPC .......... *H02M 3/28* (2013.01); *H02M 3/3353* (2013.01); *H02M 3/33546* (2013.01); *H02J 2007/0059* (2013.01); *H02M 2001/0009* (2013.01); *H02M 2001/0067* (2013.01)

(58) Field of Classification Search
CPC .... H02J 7/53873; H02J 7/53875; H02J 7/527; H02J 7/49; H02J 7/483; H02J 7/487; H02J 7/497; H02J 7/537; H02J 7/003; H02J 7/538; H02J 7/53835; H02J 7/5381; H02J 7/53846; H02J 2007/0059; H02M 2001/0009; H02M 2001/0048; H02M 2001/0054; H02M 2001/0058; H02M 2001/0067; H02M 2001/0083; H02M 2001/007; H02M 3/3353; H02M 3/33546; H02M 3/33553; H02M 3/33584; H02M 3/335; H02M 3/07; H02M 3/18; H02M 3/3372; H02M 3/3378; H02M 3/337; H02M 3/3376; H02M 3/33592; H02M 3/28; H02M 3/33569; H02M 3/33523; H02M 3/3384; H02M 1/32; H02M 1/36; H02M 1/08; H02M 1/42; Y02B 50/1425; H01F 2038/426; H01F 2007/085
See application file for complete search history.

(56) References Cited

U.S. PATENT DOCUMENTS

| | | | | |
|---|---|---|---|---|
| 9,455,641 | B2* | 9/2016 | Kondo | H02M 3/33584 |
| 2013/0044519 | A1* | 2/2013 | Teraura | H02M 3/33584 |
| | | | | 363/17 |
| 2013/0057200 | A1* | 3/2013 | Potts | H02M 3/33584 |
| | | | | 320/107 |
| 2013/0100707 | A1* | 4/2013 | Hatakeyama | H02M 3/24 |
| | | | | 363/17 |
| 2014/0104890 | A1* | 4/2014 | Matsubara | H02M 3/33584 |
| | | | | 363/17 |
| 2014/0254203 | A1* | 9/2014 | Dai | H02M 3/3353 |
| | | | | 363/17 |
| 2015/0085533 | A1* | 3/2015 | Tanahashi | H02M 1/10 |
| | | | | 363/17 |
| 2015/0381064 | A1* | 12/2015 | Matsubara | H02M 3/33584 |
| | | | | 363/17 |
| 2016/0087545 | A1* | 3/2016 | Higaki | H02J 7/0054 |
| | | | | 363/17 |
| 2016/0204707 | A1* | 7/2016 | Takahara | H02M 1/4258 |
| | | | | 363/16 |
| 2016/0233777 | A1* | 8/2016 | Murakami | H02M 3/33561 |
| 2016/0352253 | A1* | 12/2016 | Liu | H02M 7/53871 |
| 2017/0070155 | A1* | 3/2017 | Takahara | H02M 3/33569 |
| 2017/0237354 | A1* | 8/2017 | Takahara | H02M 3/28 |
| | | | | 363/17 |
| 2017/0310212 | A1* | 10/2017 | Higaki | G05F 1/38 |
| 2017/0358996 | A1* | 12/2017 | Higaki | H02M 1/083 |
| 2018/0350513 | A1* | 12/2018 | Murakami | H01F 37/00 |

* cited by examiner

FIG. 2
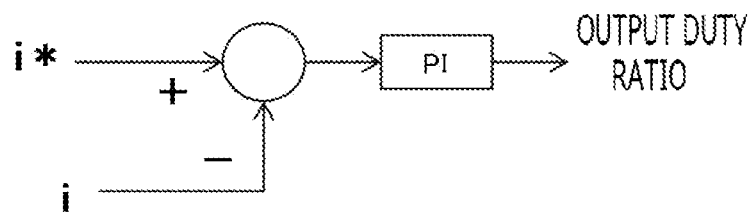
FIG. 3
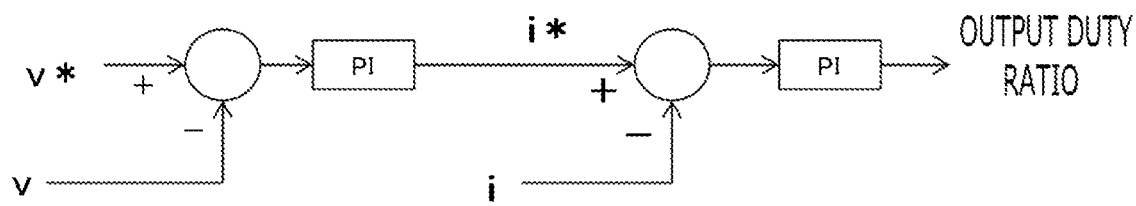
FIG. 4   FIRST POWER TRANSMISSION OF STEP-UP OPERATION (STEP-UP CHARGE)
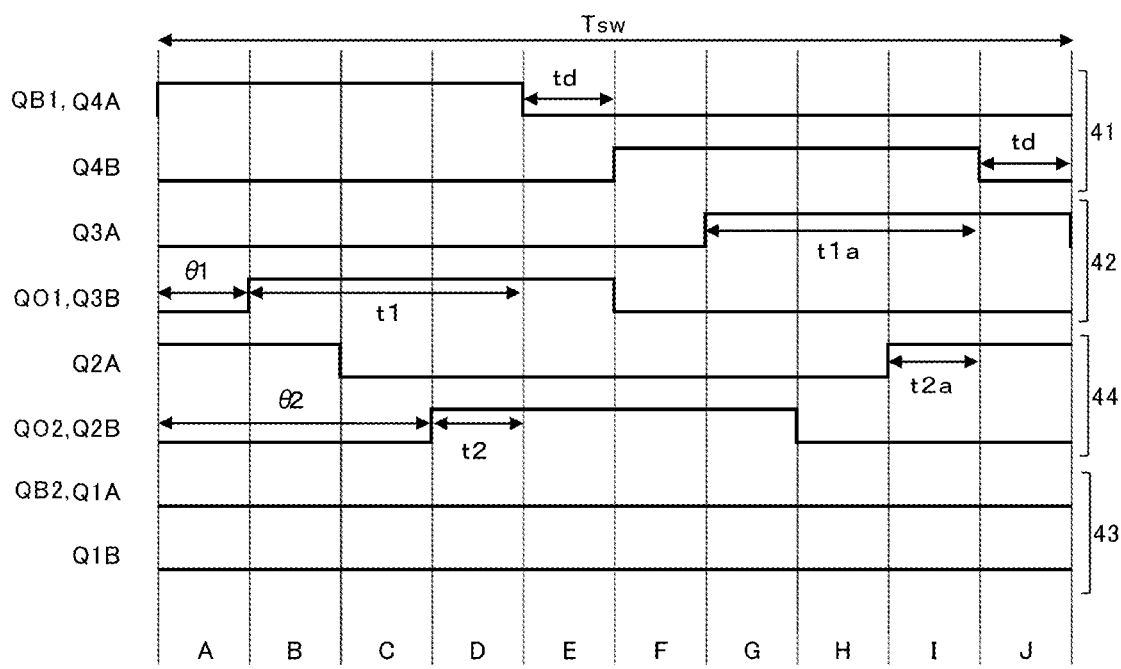

CURRENT ROUTE OF PERIOD C OF FIG. 4

CURRENT ROUTE OF PERIOD D OF FIG. 5

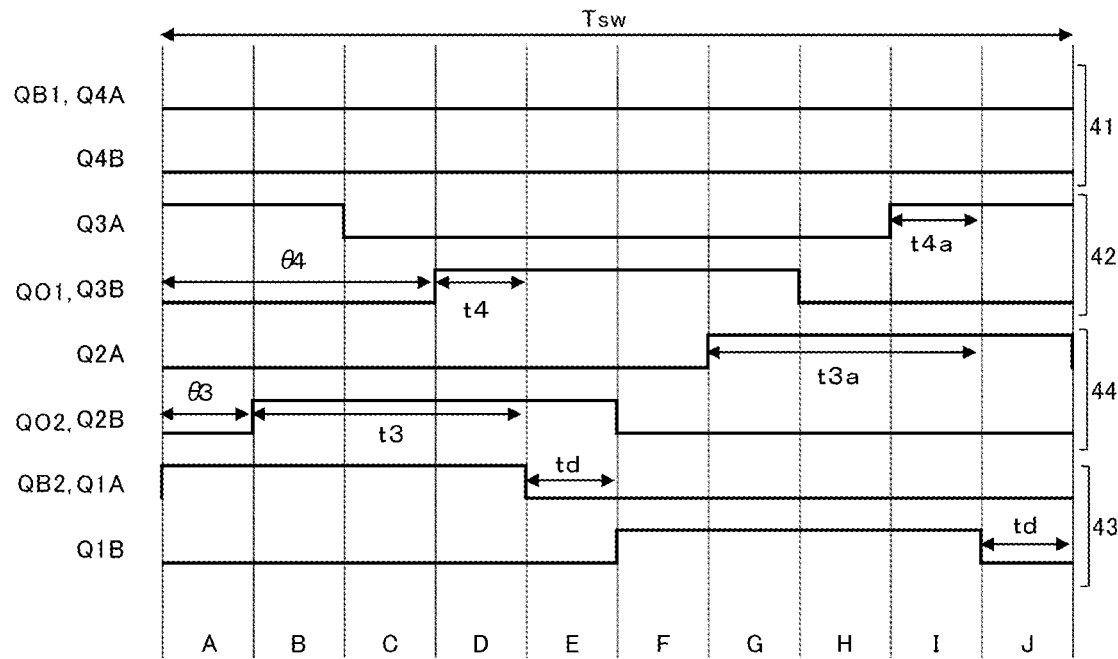
FIG. 9 SECOND POWER TRANSMISSION OF STEP-UP OPERATION (STEP-UP DISCHARGE)
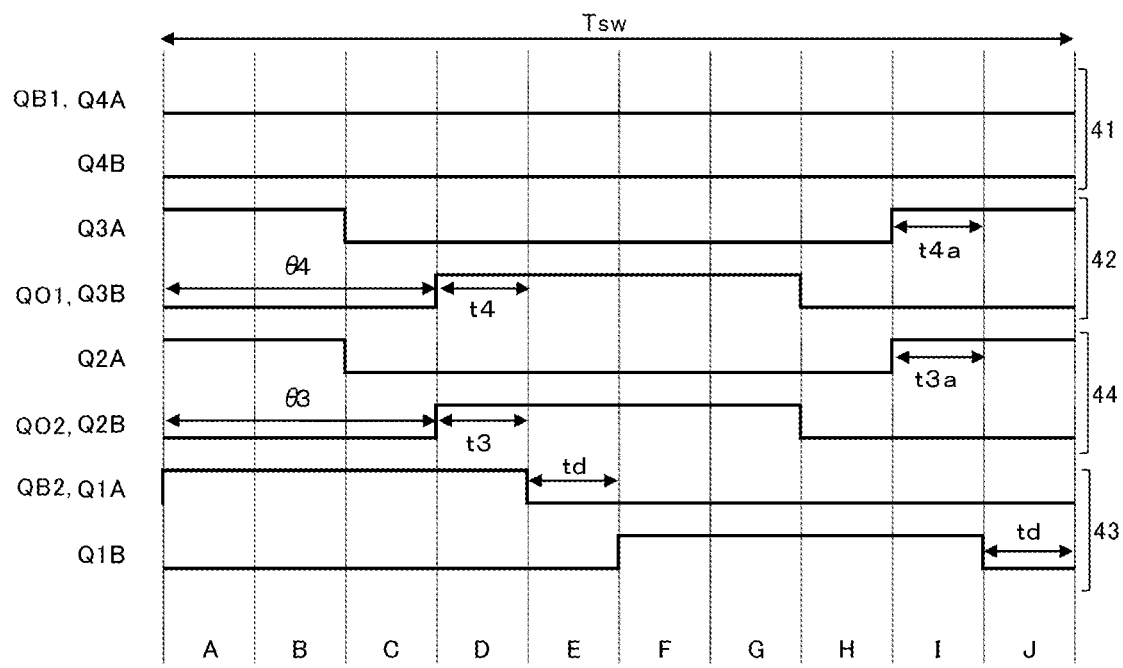
FIG. 10 SECOND POWER TRANSMISSION OF STEP-DOWN OPERATION (STEP-DOWN DISCHARGE)

FIG. 16 SECOND POWER TRANSMISSION OF STEP-UP OPERATION (STEP-UP DISCHARGE)

DC/DC CONVERTER

TECHNICAL FIELD

The present disclosure relates to a DC/DC converter which performs bidirectional power transmission between a first DC power source and a second DC power source.

BACKGROUND ART

With regard to the DC/DC converter as described above, the DC/DC converter disclosed in PLT 1 described below is known. In the technology of PLT 1, across a transformer, the first converter of full bridge circuit is provided in the first DC power source side, and the second converter of full bridge circuit is provided in the second DC power source side. The first reactor is provided between the first winding of the transformer and the first converter, and the second reactor is provided between the second winding of the transformer and the second converter.

When a voltage of the first DC power source or the second DC power source is higher than a voltage generated in the first winding or the second winding of the transformer, that is, when the step-up operation is necessary, the step-up operation is performed using the first reactor or the second reactor; and on the other hand, when the step-down operation is necessary, the step-up operation is not performed. Therefore, in the technology of PLT 1, total four operation modes are switched according to the output DUTY ratio which represents the transmission power amount. The four operation modes consist of an operation mode for performing the step-up operation (step-up charge) and a operation mode for performing the step-down operation (step-down charge) in the first power transmission (charge of the second DC power source) which transmits electric power to the second DC power source from the first DC power source, and an operation mode for performing the step-up operation (step-up discharge) and a operation mode for performing the step-down operation (step-down discharge) in the second power transmission (discharge of the second DC power source) which transmits electric power to the first DC power source from the second DC power source.

Specifically, in the technology of PLT 1, as shown in FIG. 28 of PLT 1, the phase shift amounts $\theta 1$, $\theta 2$, $\theta 3$, $\theta 4$, which are the relative phases of the on-off driving signal of each switching device, are changed according to the output DUTY ratio.

CITATION LIST

Patent Literature

PLT 1: WO2015/004825

SUMMARY OF INVENTION

Technical Problem

However, in the technology of PLT 1, in order to cover all of four operation modes, the variable range of the output DUTY ratio needed to be enlarged. In the technology of PLT 1, as shown in FIG. 28 of PLT 1, in the step-up charge, the first phase shift amount $\theta 1$ is fixed to the minimum value regardless of change of the output DUTY ratio, and the second phase shift amount $\theta 2$ is increased from the minimum value as the output DUTY ratio increases. In the technology of PLT 1, in the step-up discharge, the third phase shift amount $\theta 3$ is fixed to the minimum value regardless of change of the output DUTY ratio, and the fourth phase shift amount $\theta 4$ is gradually increased from the minimum value as the output DUTY ratio increases. Accordingly, in the technology of PLT 1, in the step-up charge and the step-up discharge, a change of the phase difference between the first phase shift amount $\theta 1$ and the second phase shift amount $\theta 2$ to a change of the output DUTY ratio, and a change of the phase difference between the third phase shift amount $\theta 3$ and the fourth phase shift amount $\theta 4$ to a change of the output DUTY ratio are small; and adjustment amount of the transmission power amount becomes small. Therefore, in the technology of PLT 1, there was a problem that it is difficult to adjust the transmission power amount quickly by a change of the output DUTY ratio.

Accordingly, for example, when the voltage of the second DC power source is higher than the voltage generated in the second winding of the transformer in the first power transmission from the first DC power source to the second DC power source, although it is necessary to switch the first power transmission from the step-down operation to the step-up operation, it could not switch with a good response by the technology of PLT 1, but there was a problem that the output power fluctuates. Accordingly, in order to stabilize the DC power voltage, it is necessary to increase a capacity of the capacitor, and there was a problem of causing enlargement of the DC/DC converter.

Thus, it is desirable to provide a DC/DC converter enabling the step-up operation and the step-down operation in bidirectional power transmission, and capable of adjusting transmission power amount with a good response.

Solution to Problem

A DC/DC converter according to the present disclosure is a DC/DC converter which performs bidirectional power transmission between a first DC power source and a second DC power source, the DC/DC converter including:

a transformer which performs power conversion between a first winding and a second winding;

a first converter which is provided with a first bridge circuit in which two of switching devices to each of which a diode is connected in inverse parallel are connected in series between a first positive electrode wire and a first negative electrode wire which are connected to the first DC power source, and a second bridge circuit in which two of the switching devices are connected in series between the first positive electrode wire and the first negative electrode wire; and in which a middle point of the first bridge circuit and a middle point of the second bridge circuit are connected to both terminals of the first winding, respectively;

a second converter which is provided with a third bridge circuit in which two of the switching devices are connected in series between a second positive electrode wire and a second negative electrode wire which are connected to the second DC power source, and a fourth bridge circuit in which two of the switching devices are connected in series between the second positive electrode wire and the second negative electrode wire; and in which a middle point of the third bridge circuit and a middle point of the fourth bridge circuit are connected to both terminals of the second winding, respectively;

one or both of a first reactor connected in series in connection path between the first converter and the first winding, and a second reactor connected in series in connection path between the second converter and the second winding; and a control circuit which performs on-off driving control of the switching devices of the first converter and the second converter, wherein by setting the switching device of either one of positive electrode side and negative electrode side in the first bridge circuit, to a first reference device, setting the switching device of an electrode side opposite to the first reference device in the second bridge circuit, to a first diagonal device, setting the switching device of either one of positive electrode side and negative electrode side in the third bridge circuit, to a second reference device, and setting the switching device of an electrode side opposite to the second reference device in the fourth bridge circuit, to a second diagonal device, in a case of performing a first power transmission which transmits electric power to the second DC power source from the first DC power source, the control circuit performs on-off driving control of the positive electrode side and the negative electrode side switching devices in each of the first bridge circuit, the second bridge circuit, and the fourth bridge circuit, and by setting a phase shift amount of on-off driving signal of the first diagonal device to on-off driving signal of the first reference device, to a first phase shift amount, and setting a phase shift amount of on-off driving signal of the second diagonal device to on-off driving signal of the first reference device, to a second phase shift amount, when the first transmission power amount is larger than a first reference point which is preliminarily set to a larger value than 0, the control circuit decreases the first phase shift amount and increases the second phase shift amount from the first phase shift amount and the second phase shift amount when the first transmission power amount is at the first reference point, as the first transmission power amount increases.

Advantage of Invention

The DC/DC converter according to the present disclosure enables the step-up operation and the step-down operation in bidirectional power transmission. Since in the step-up operation, a change of the phase difference between the first phase shift amount and the second phase shift amount to a change of the first transmission power amount can be enlarged, transmission power amount can be adjusted with a good response.

BRIEF DESCRIPTION OF THE DRAWINGS

FIG. 2 is a block diagram of the control circuit of the first power transmission (charge) according to Embodiment 1.

FIG. 3 is a block diagram of the control circuit of the second power transmission (discharge) according to Embodiment 1.

FIG. 4 is a time chart showing waveforms of the on-off driving signal of each switching device in the first power transmission (step-up charge) of the step-up operation according to Embodiment 1.

FIG. 9 is a time chart showing waveforms of the on-off driving signal of each switching device in the second power transmission (step-up discharge) of the step-up operation according to Embodiment 1.

FIG. 10 is a time chart showing waveforms of the on-off driving signal of each switching device in the second power transmission (step-down discharge) of the step-down operation according to Embodiment 1.

DESCRIPTION OF EMBODIMENTS

Embodiment 1

Figure 1:
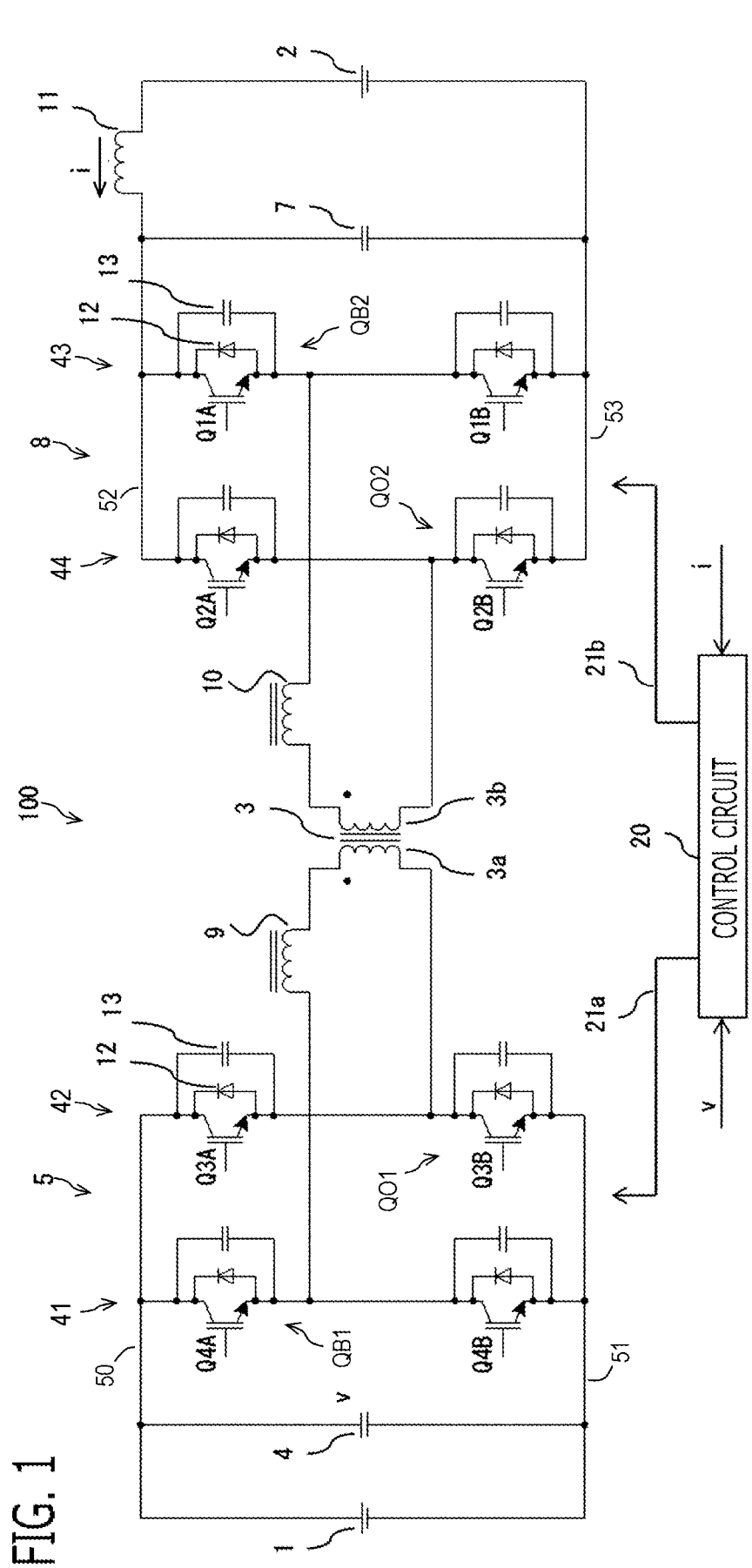
FIG. 1 is a schematic configuration diagram of the DC/DC converter according to Embodiment 1.

A DC/DC converter 100 according to Embodiment 1 will be explained. FIG. 1 is a schematic circuit configuration diagram of the DC/DC converter 100 according to the present embodiment. The DC/DC converter 100 performs bidirectional power transmission between a first DC power source 1 and a second DC power source 2.

In the present embodiment, the second DC power source 2 is a battery 2, and the DC/DC converter 100 is a battery charge and discharge device 100 which performs charge and discharge of the battery 2. Hereinafter, the first DC power source 1 is referred to as the DC power source 1, the second DC power source 2 is referred to as the battery 2, and the DC/DC converter 100 is referred to as the battery charge and discharge device 100.

The battery charge and discharge device 100 is provided with a transformer 3, a first converter 5, a second converter 8, a first reactor 9, a second reactor 10, a control circuit 20, and the like. The transformer 3 is an electric power converter which performs power conversion by electromagnetic induction between a first winding 3a and a second winding 3b. By the transformer 3, circuits on the side of the first winding 3a connected to the DC power source 1 and circuits on the side of the second winding 3b connected to the battery 2 are insulated.

The first converter 5 is provided with a first bridge circuit 41 and a second bridge circuit 42, and is a full bridge circuit. In the first bridge circuit 41, two switching devices Q4A, Q4B are connected in series between the first positive electrode wire 50 and the first negative electrode wire 51. In the second bridge circuit 42, the two switching devices Q3A, the Q3B are connected in series between the first positive electrode wire 50 and the first negative electrode wire 51. That is, the first bridge circuit 41 is a series connection circuit of the first switching device Q4A of positive electrode side, and the first switching device Q4B of negative electrode side. The second bridge circuit 42 is a series connection circuit of the second switching device Q3A of positive electrode side, and the second switching device Q3B of negative electrode side.

IGBT (Insulated Gate Bipolar Transistor), MOSFET (Metal Oxide Semiconductor Field Effect Transistor) and the like are used for each switching device Q4A, Q4B, Q3A, Q3B. A diode 12 (hereinafter, referred to as the inverse parallel diode 12) is connected in inverse parallel to each switching device Q4A, Q4B, Q3A, Q3B. Each switching device Q4A, Q4B, Q3A, Q3B is a zero voltage switching circuit whose both ends voltage at switching becomes almost zero voltage. A capacitor 13 (hereinafter, referred to as the parallel capacitor 13) is connected in parallel to each switching device Q4A, Q4B, Q3A, Q3B.

The first positive electrode wire 50 and the first negative electrode wire 51 are connected to the DC power source 1. The middle point of the first bridge circuit 41 and the middle point of the second bridge circuit 42 are connected to both the terminals of the first winding 3a. Here, the middle point is a connection node of the positive electrode side switching device and the negative electrode side switching device. The first converter 5 performs bidirectional power conversion between AC and DC between the DC power source 1 and the first winding 3a.

The first reactor 9 is connected in series in a connection path between the first converter 5 and the first winding 3a. In the present embodiment, the first reactor 9 is connected in series in a connection path between the middle point of the first bridge circuit 41, and the first terminal of the first winding 3a.

The first converter 5 is provided with a first smoothing capacitor 4 connected between the first positive electrode wire 50 and the first negative electrode wire 51 in parallel to the DC power source 1.

The second converter 8 is provided with a third bridge circuit 43 and a fourth bridge circuit 44, and is a full bridge circuit. In the third bridge circuit 43, the two switching devices Q1A, Q1B are connected in series between the second positive electrode wire 52 and the second negative electrode wire 53. In the fourth bridge circuit 44, the two switching devices Q2A, Q2B are connected in series between the second positive electrode wire 52 and the second negative electrode wire 53. That is, the third bridge circuit 43 is a series connection circuit of the third switching device Q1A of positive electrode side, and the third switching device Q1B of negative electrode side. The fourth bridge circuit 44 is a series connection circuit of the fourth switching device Q2A of positive electrode side, and the fourth switching device Q2B of negative electrode side.

IGBT, MOSFET, and the like are used for each switching device Q1A, Q1B, Q2A, Q2B. The inverse parallel diode 12 is connected in inverse parallel to each switching device Q1A, Q1B, Q2A, Q2B. The parallel capacitor 13 is connected in parallel to each switching device Q1A, Q1B, Q2A, Q2B.

The second positive electrode wire 52 and the second negative electrode wire 53 are connected to the battery 2. The middle point of the third bridge circuit 43 and the middle point of the fourth bridge circuit 44 are connected to both the terminals of the second winding 3b. The second converter 8 performs bidirectional power conversion between AC and DC between the battery 2 and the second winding 3b.

The second reactor 10 is connected in series in a connection path between the second converter 8 and the second winding 3b. In the present embodiment, the second reactor 10 is connected in series in a connection path between the middle point of the third bridge circuit 43, and the first terminal of the second winding 3b.

The second converter 8 is provided with a second smoothing capacitor 7 connected between the second positive electrode wire 52 and the second negative electrode wire 53 in parallel to the battery 2. The reactor 11 is connected in series in the second positive electrode wire 52 between the second smoothing capacitor 7 and the battery 2.

The reactor 11 is provided with a current sensor (unillustrated) in order to detect current i of the battery 2. The current sensor may be provided at the second converter 8 side of the second smoothing capacitor 7. An arrow direction in FIG. 1 is a positive direction of the current i. Accordingly, when the current i is positive, the battery 2 is discharged, and when the current i is negative, the battery 2 is charged. In order to detect an output voltage v outputted to the DC power source 1 from the first converter 5, a voltage sensor (unillustrated) which detects the both ends voltage of the first smoothing capacitor 4 is provided. Output signals of the current sensor and the voltage sensor are inputted into the control circuit 20. The control circuit 20 detects the current i of the battery 2, and the output voltage v of the first converter 5 based on the output signals of the current sensor and voltage sensor which were inputted.

The control circuit 20 is provided with processing circuits which performs on-off driving control of each switching device. The processing circuits of the control circuit 20 may be constituted by digital electronic circuits, such as arithmetic processor and storage apparatus, may be constituted by analog electronic circuits, such as comparator, operational amplifier, and differential amplifying circuit, or may be constituted by both of the digital electronic circuits and the analog electronic circuits.

<Calculation of the Output DUTY Ratio which Represents Transmission Power Amount>

The control circuit 20 generates driving signals 21a, 21b which perform on-off driving control of each switching device of the first converter 5 and the second converter 8 based on the transmission power amount between the DC power source 1 and the battery 2.

In the present embodiment, the control circuit 20 calculates an output DUTY ratio as a variable which represents the transmission power amount. Specifically, the control circuit 20 calculates the output DUTY ratio based on a command value of transmission power amount, and performs on-off driving control of each switching device of the first converter 5 and the second converter 8 based on the output DUTY ratio.

In the present embodiment, the control circuit 20 changes the output DUTY ratio, which is an intermediate variable, by feedback control so that actual transmission power amount approaches the command value of transmission power amount.

When the control circuit 20 performs a first power transmission which transmits electric power to the battery 2 from the DC power source 1 (in case of charging the battery 2), the control circuit 20 performs feedback control which changes the output DUTY ratio so that the detected current i approaches a current command value i* which is set based on the command value of transmission power amount, as shown in the block diagram of FIG. 2. In the present embodiment, the control circuit 20 subtracts the current i from current command value i* so as to calculate a difference current, performs proportional and integral calculation (PI calculation) to the calculated difference current so as to calculate the output DUTY ratio. The positive or negative signs of the current i and the current command value i* are appropriately set according to charge or discharge.

On the other hand, when the control circuit 20 performs a second power transmission which transmits electric power to the DC power source 1 from the battery 2 (in case of discharging the battery 2), the control circuit 20 performs feedback control which changes the output DUTY ratio so that the detected output voltage v of the first converter 5 approaches the voltage command value v* which is set based on the command value of transmission power amount, as shown in the block diagram of FIG. 3. In the present embodiment, the control circuit 20 subtracts the output voltage v from the voltage command value v* so as to calculate a difference voltage, performs proportional and integral calculation (PI calculation) to the calculated difference voltage so as to calculate the current command value i*. Then, the control circuit 20 subtracts the current i from the current command value i* of the battery 2 so as to calculate a difference current, and performs proportional and integral calculation (PI calculation) to the calculated difference current so as to calculate the output DUTY ratio. Alternatively, the control circuit 20 may perform proportional and integral calculation (PI calculation) to a difference voltage obtained by subtracting the output voltage v from the voltage command value v* so as to calculate the output DUTY ratio directly.

<First and Second Reference Devices QB1, QB2, First and Second Diagonal Device Q01, Q02>

The control circuit 20 sets the switching device of either one of the positive electrode side and the negative electrode side in the first bridge circuit 41, to a first reference device QB1. In the present embodiment, the first switching device Q4A of the positive electrode side in the first bridge circuit 41 is set to the first reference device QB1. The control circuit 20 sets the switching device of an electrode side opposite to the first reference device QB1 in the second bridge circuit 42 to a first diagonal device QO1. In the present embodiment, the second switching device Q3B of the negative electrode side opposite to the first reference device QB1 which is set to the positive electrode side in the second bridge circuit 42 is set to the first diagonal device QO1.

From the opposite point of view, a bridge circuit of the first converter 5 in which the first reference device QB1 is set is the first bridge circuit 41, and a bridge circuit of the first converter 5 in which the first diagonal device Q01 is set is the second bridge circuit 42.

The control circuit 20 sets the switching device of either one of the positive electrode side and the negative electrode side in the third bridge circuit 43, to second reference device QB2. In the present embodiment, the third switching device Q1A of the positive electrode side which is the same side as the first reference device QB1 in the third bridge circuit 43 is set to the second reference device QB2. The control circuit 20 sets the switching device of an electrode side opposite to the second reference device QB2 in the fourth bridge circuit 44 to a second diagonal device Q02. In the present embodiment, the fourth switching device Q2B of negative electrode side opposite to the second reference device QB2 which is set to positive electrode side in the fourth bridge circuit 44 is set to the second diagonal device Q02.

From the opposite point of view, a bridge circuit of the second converter 8 in which the second reference device QB2 is set is the third bridge circuit 43, and a bridge circuit of the second converter 8 in which the second diagonal device Q02 is set is the fourth bridge circuit 44.

<Basic Control Behavior of First Power Transmission (Charge of Battery 2)>

Figure 5:
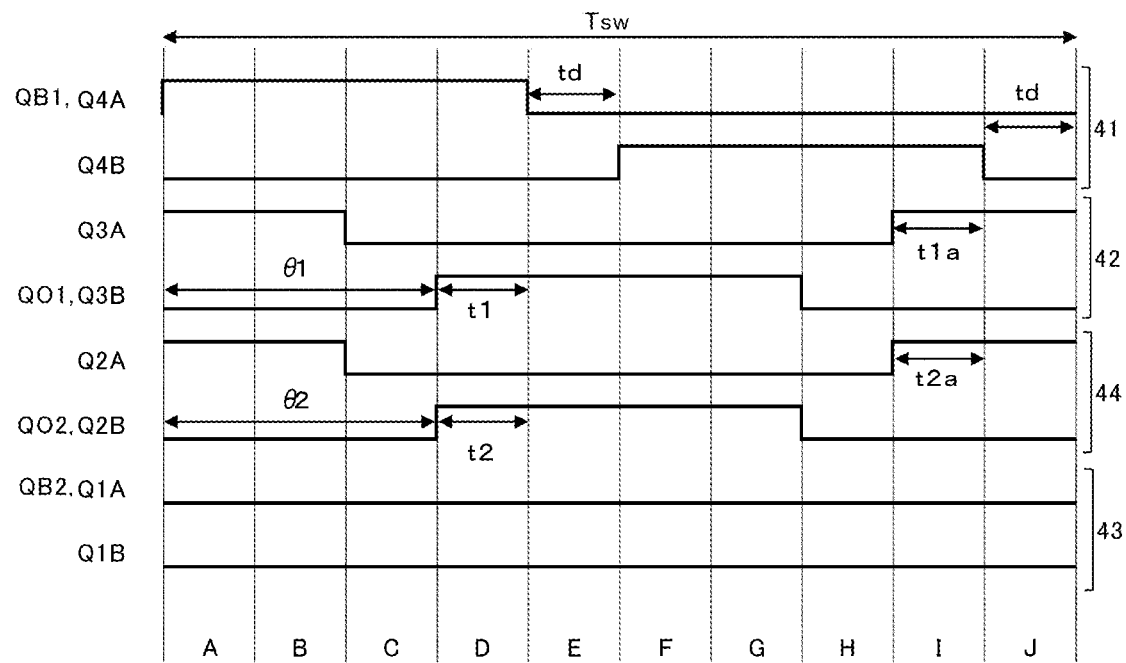
FIG. 5 is a time chart showing waveforms of the on-off driving signal of each switching device in the first power transmission (step-down charge) of the step-down operation according to Embodiment 1.

FIG. 4 and FIG. 5 show time waveforms of the driving signal of each switching device Q4A, Q4B, Q3A, Q3B, Q2A, Q2B, Q1A, Q1B of the first converter 5 and the second converter 8, in the case of performing the first power transmission (charge of the battery 2) which transmits electric power to the battery 2 from the DC power source 1. FIG. 4 shows an example in a case of a charge with step-up operation of the second reactor 10 (referred to as a step-up charge), and FIG. 5 shows an example in a case of a charge without step-up operation of the second reactor 10 (referred to as a step-down charge). However, FIG. 4 and FIG. 5 show examples for explaining principles of the step-up charge and the step-down charge, and does not coincide with setting values of the first phase shift amount θ1 and the second phase shift amount θ2 according to the present embodiment described below using FIG. 11. In the example of FIG. 4 and FIG. 5, a switching period Tsw of the first bridge circuit 41 is divided in 10 periods of periods A to J; and to each period A to J, a gate pattern which is a combination pattern of on or off driving signal of each switching element is set.

In the case of performing the first power transmission (charge of the battery 2) which transmits electric power to the battery 2 from the DC power source 1, the control circuit 20 turns on the positive electrode side and the negative electrode side switching devices in each of the first bridge circuit 41, the second bridge circuit 42, and the fourth bridge circuit 44 once respectively at an equal intervals alternately in the preliminarily set switching period Tsw. On the other hand, the control circuit 20 always turns off the positive electrode side and the negative electrode side third switching devices Q1A, Q1B of the third bridge circuit 43.

In the present embodiment, the control circuit 20 turns on the positive electrode side and the negative electrode side switching devices at equal intervals alternately while interposing a short circuit prevention time td. That is, the positive electrode side and the negative electrode side switching devices are controlled by the ON time ratio of 50%, respectively, if the short circuit prevention time td is removed. The short circuit prevention time td is a time for preventing simultaneous on of the positive electrode side and the negative electrode side switching devices. During the short circuit prevention time td, both of the positive electrode side and the negative electrode side switching devices are turned off.

For example, about the first bridge circuit 41, the control circuit 20 turns on the driving signal of the positive electrode side first switching device Q4A during the ON period; then, after the short circuit prevention time td passes, the control circuit 20 turns on the driving signal of the negative electrode side first switching device Q4B during the ON period; and then, after the short circuit prevention time td passes, the control circuit 20 turns on the driving signal of the positive electrode side first switching device Q4A during the ON period again. The short circuit prevention time td is set to a time when a voltage of the capacitor 13 connected in parallel with each switching device increases to a voltage of the first smoothing capacitor 4 or drops to near a zero voltage, when each switching device of the first converter 5 is turned on. The ON period is set to a value obtained by dividing a value subtracting a double value of the short circuit prevention time td from the switching period Tsw by 2 (=(Tsw−2×td)/2).

The control circuit 20 sets a phase shift amount of on-off driving signal of the first diagonal device Q01 (the negative electrode side second switching device Q3B) to on-off driving signal of the first reference device QB1 (the positive electrode side first switching device Q4A), to a first phase shift amount θ1; and sets a phase shift amount of on-off driving signal of the second diagonal device QO2 to on-off driving signal of the first reference device QB1, to a second phase shift amount θ2. Then, the control circuit 20 changes the first phase shift amount θ1 and the second phase shift amount θ2 based on the transmission power amount (in this example, the output DUTY ratio). The first phase shift amount θ1 and the second phase shift amount θ2 are shift amounts in the phase advance direction.

In the case of the step-up charge of FIG. 4, the second phase shift amount θ2 is a larger value than the first phase shift amount θ1. In the case of the step-down charge of FIG. 5, the first phase shift amount θ1 is the same value as the second phase shift amount θ2.

Here, behavior in charging will be explained in detail. As shown in FIG. 4 and FIG. 5, if a period during which the first reference device QB1 (the positive electrode side first switching device Q4A) and the first diagonal device Q01 (the negative electrode side second switching device Q3B) are turned on simultaneously is defined as a first diagonal ON time t1, the first diagonal ON time t1 changes according to the first phase shift amount θ1. A first diagonal ON time t1a during which the negative electrode side first switching device Q4B and the positive electrode side second switching device Q3A are turned on simultaneously is also equal to the first diagonal ON time t1.

On-off driving signals of the first switching devices Q4A, Q4B of the first bridge circuit 41 are set to virtual on-off driving signals of the third switching devices Q1A, Q1B of the third bridge circuit 43. Then, if a period during which the virtual on-off driving signal of the second reference device QB2 (the positive electrode side third switching device Q1A) and the on-off driving signal of the second diagonal device Q02 (the negative electrode side fourth switching device Q2B) are turned on simultaneously is defined as the second virtual diagonal ON time t2, the second virtual diagonal ON time t2 changes according to the second phase shift amount θ2. A second virtual diagonal ON time t2a during which the virtual on-off driving signal of the negative electrode side third switching device Q1B and the on-off driving signal of the positive electrode side fourth switching device Q2A are turned on simultaneously is also equal to the second virtual diagonal ON time t2.

Since current routes corresponding to each gate pattern shown in FIG. 4 and FIG. 5 are explained in the above PLT 1, explanation of those other than characteristic gate patterns concerning the present embodiment is omitted.

Figure 6:
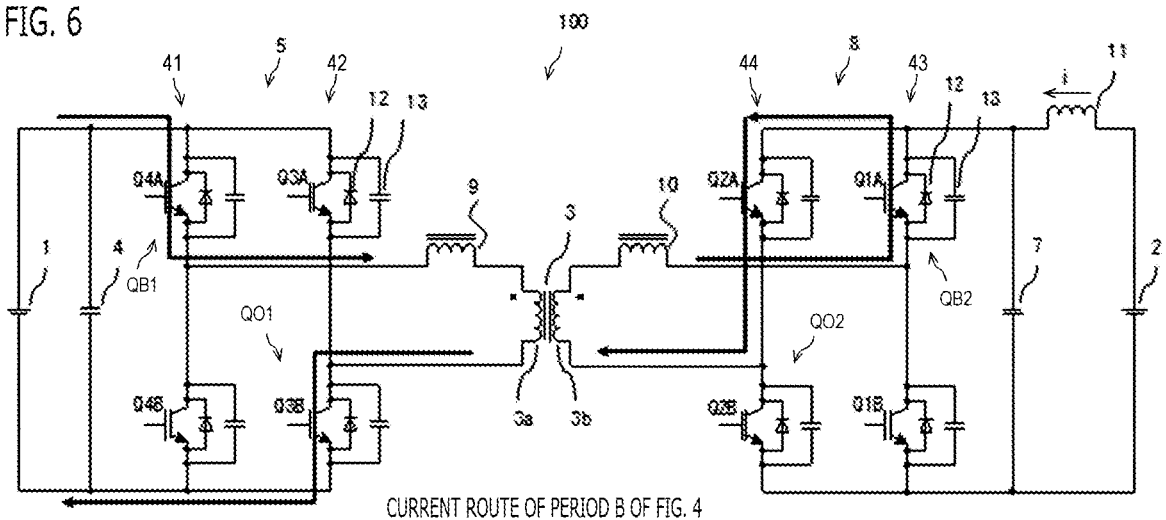
FIG. 6 is a figure showing the current route corresponding to the period B of FIG. 4 according to Embodiment 1.

It is explained that FIG. 4 shows charge (step-up charge) of the battery 2 with the step-up operation of the second reactor 10. FIG. 6 shows a current route corresponding to the gate pattern of the period B in FIG. 4. In the period B in FIG. 4, in the first converter 5, the positive electrode side first switching device Q4A (the first reference device QB1) and the negative electrode side second switching device Q3B (the first diagonal device QO1) are turned on simultaneously, and diagonal two devices are electrically conducted. Therefore, via the positive electrode side first switching device Q4A and the negative electrode side second switching device Q3B, energy is transmitted to the first reactor 9 from the DC power source 1 side, and the first reactor 9 is excited.

In the period B, in the second converter 8, the positive electrode side fourth switching device Q2A is turned on. Accordingly, current recirculates to the second reactor 10 via the positive electrode side fourth switching device Q2A and the inverse parallel diode 12 of the positive electrode side third switching device Q1A, and the second reactor 10 is excited. Therefore, in the period B, the first reactor 9 and the second reactor 10 are excited, and this excitation operation is referred to as a step-up.

Figure 7:
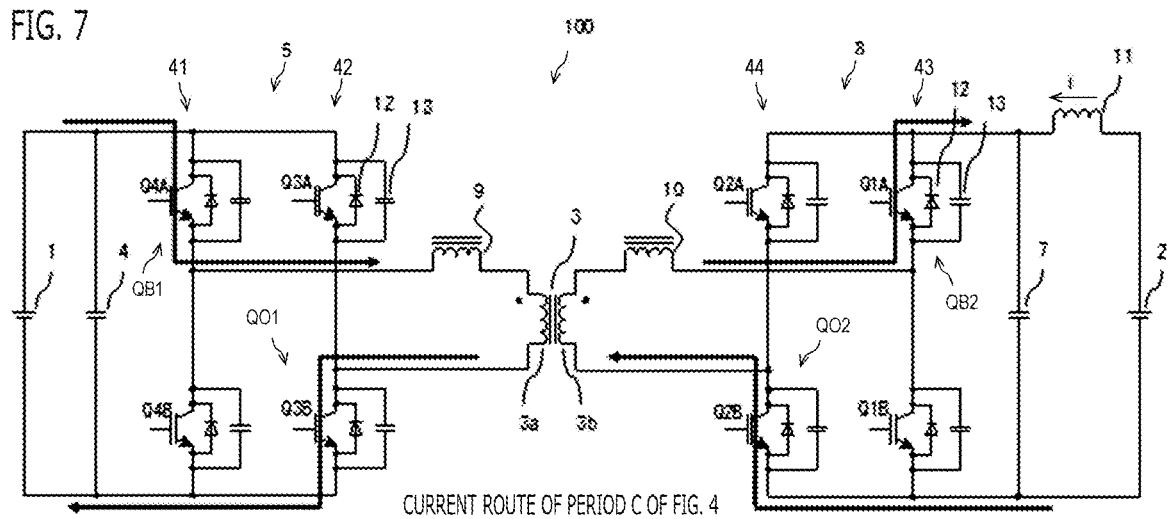
FIG. 7 is a figure showing the current route corresponding to the period C of FIG. 4 according to Embodiment 1.

FIG. 7 shows a current route corresponding to the gate pattern of the period C in FIG. 4. In the period C in FIG. 4, similarly to the period B, in the first converter 5, the positive electrode side first switching device Q4A (the first reference device QB1) and the negative electrode side second switching device Q3B (the first diagonal device QO1) are turned on simultaneously, and the first reactor 9 is excited.

On the other hand, in the period C, in the second converter 8, the positive electrode side fourth switching device Q2A is turned off, and current flows into the battery 2 side via the inverse parallel diode 12 of the positive electrode side third switching device Q1A and the inverse parallel diode 12 of the negative electrode side fourth switching device Q2B. Accordingly, the period C is a period during which the excitation energy of the first reactor 9 and the second reactor 10 is transmitted to the battery 2 side. Therefore, FIG. 4 shows charge (step-up charge) of the battery 2 with the step-up operation of the second reactor 10.

Figure 8:
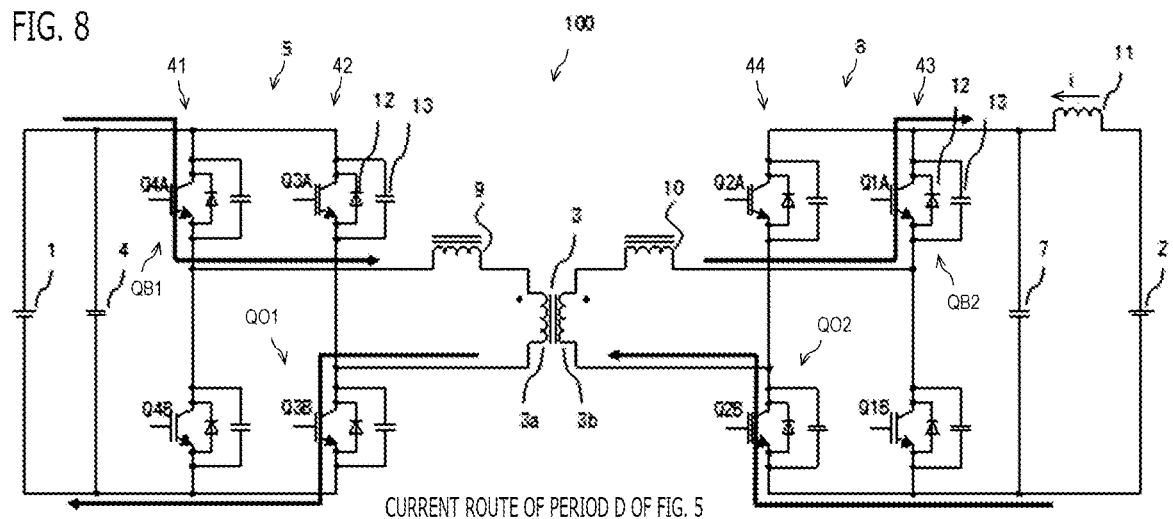
FIG. 8 is a figure showing the current route corresponding to the period D of FIG. 5 according to Embodiment 1.

Next, it is explained that FIG. 5 shows charge (step-down charge) of the battery 2 without the step-up operation of the second reactor 10. FIG. 8 shows a current route corresponding to the gate pattern of the period D in FIG. 5. In the period D in FIG. 5, in the first converter 5, the positive electrode side first switching device Q4A (the first reference device QB1) and the negative electrode side second switching device Q3B (the first diagonal device Q01) are turned on simultaneously. Accordingly, energy is transmitted to the first reactor 9 from the DC power source 1 side, and the first reactor 9 is excited.

On the other hand, in the period D, in the second converter 8, the negative electrode side fourth switching device Q2B is turned on, current flows into the battery 2 side via the inverse parallel diode 12 of the positive electrode side third switching device Q1A, and the negative electrode side fourth switching device Q2B or the inverse parallel diode 12 of the negative electrode side fourth switching device Q2B. Therefore, FIG. 5 shows charge (step-down charge) of the battery 2 without the step-up operation of the second reactor 10.

<Basic Control Behavior of Second Power Transmission (Discharge of Battery 2)>

FIG. 9 and FIG. 10 show time waveforms of the driving signal of each switching device Q4A, Q4B, Q3A, Q3B, Q2A, Q2B, Q1A, Q1B of the first converter 5 and the second converter 8, in the case of performing the second power transmission (discharge of the battery 2) which transmits electric power to the DC power source 1 from the battery 2. FIG. 9 shows an example in the case of a discharge with step-up operation of the first reactor 9 (referred to as a step-up discharge), and FIG. 10 shows an example in the case of a discharge without step-up operation of the first reactor 9 (referred to as a step-down discharge). However, FIG. 9 and FIG. 10 show examples for explaining principles of the step-up discharge and the step-down discharge, and does not coincide with setting values of the third phase shift amount θ3 and the fourth phase shift amount θ4 according to the present embodiment described below using FIG. 11. In the example of FIG. 9 and FIG. 10, the switching period Tsw of the third bridge circuit 43 is divided in 10 periods of periods A to J; and a gate pattern is set to each period A to J.

In the case of performing the second power transmission (discharge of the battery 2) which transmits electric power to the DC power source 1 from the battery 2, the control circuit 20 turns on the positive electrode side and the negative electrode side switching devices in each of the third bridge circuit 43, the fourth bridge circuit 44, and the second bridge circuit 42 once respectively at an equal intervals alternately in the preliminarily set switching period Tsw. On the other hand, the control circuit 20 always turns off the positive electrode side and the negative electrode side first switching devices Q4A, Q4B of the first bridge circuit 41.

In the present embodiment, similarly to the case of above charge of the battery 2, the control circuit 20 turns on the positive electrode side and the negative electrode side switching devices at equal intervals alternately while interposing a short circuit prevention time td.

The control circuit 20 sets a phase shift amount of on-off driving signal of the second diagonal device Q02 (the negative electrode side fourth switching device Q2B) to on-off driving signal of the second reference device QB2 (the positive electrode side third switching device Q1A), to a third phase shift amount θ3; and sets a phase shift amount of on-off driving signal of the first diagonal device Q01 (the negative electrode side second switching device Q3B) to on-off driving signal of the second reference device QB2 (the positive electrode side third switching device Q1A), to a fourth phase shift amount θ4. The third phase shift amount θ3 and the fourth phase shift amount θ4 are shift amounts in the phase advance direction.

In the case of the step-up discharge of FIG. 9, the fourth phase shift amount θ4 is a larger value than the third phase shift amount θ3. In the case of the step-down discharge of FIG. 10, the third phase shift amount θ3 is the same value as the fourth phase shift amount θ4.

The on-off driving signal of each switching device in the step-up discharge shown in FIG. 9 corresponds to signal obtained by replacing the on-off driving signal of the first switching devices Q4A, Q4B and the on-off driving signal of the third switching devices Q1A, Q1B in the step-up charge shown in FIG. 4; and corresponds to signal obtained by replacing the on-off driving signal of the second switching device Q3A, Q3B and the on-off driving signal of the fourth switching device Q2A, Q2B in the step-up charge shown in FIG. 4. Similarly, the on-off driving signal of each switching device in the step-down discharge shown in FIG. 10 corresponds to signal obtained by replacing the on-off driving signal of the first switching device Q4A, Q4B and the on-off driving signal of the third switching device Q1A, Q1B in the step-down charge shown in FIG. 5; and corresponds to signal obtained by replacing the on-off driving signal of the second switching device Q3A, Q3B and the on-off driving signal of the fourth switching device Q2A, Q2B in the step-down charge shown in FIG. 5.

As shown in FIG. 9 and FIG. 10, if a period during which the second reference device QB2 (the positive electrode side third switching device Q1A) and the second diagonal device Q02 (the negative electrode side fourth switching device Q2B) are turned on simultaneously is defined as a third diagonal ON time t3, the third diagonal ON time t3 changes according to the third phase shift amount θ3. A third diagonal ON time t3a during which the negative electrode side third switching device Q1B and the positive electrode side fourth switching device Q2A are turned on simultaneously is also equal to the third diagonal ON time t3.

On-off driving signals of the third switching devices Q1A, Q1B of the third bridge circuit 43 are set to virtual on-off driving signals of the first switching devices Q4A, Q4B of the first bridge circuit 41. Then, if a period during which the virtual on-off driving signal of the first reference device QB1 (the positive electrode side first switching device Q4A) and the on-off driving signal of the first diagonal device Q01 (the negative electrode side second switching device Q3B) are turned on simultaneously is defined as the fourth virtual diagonal ON time t4, the fourth virtual diagonal ON time t4 changes according to the fourth phase shift amount θ4. A fourth virtual diagonal ON time t4a during which the virtual on-off driving signal of the negative electrode side first switching device Q4B and the on-off driving signal of the positive electrode side second switching device Q3A are turned on simultaneously is also equal to the fourth virtual diagonal ON time t4.

Also in the step-up discharge and the step-down discharge, a similar operation obtained by replacing operation of the step-up charge and operation of the step-down charge which were mentioned above using FIG. 6, FIG. 7, and FIG. 8, and replacing the first converter 5 and the second converter 8 is realized. Therefore, the detailed explanation of discharge is omitted.

<Change of Phase Shift Amount Based on Transmission Power Amount>

Next, a change of the phase shift amount based on the transmission power amount will be explained using FIG. 11. As shown in the upper row graph of FIG. 11, the control circuit 20 calculates the output DUTY ratio based on the command value of transmission power amount. In the present embodiment, the first transmission power amount transmitted to the battery 2 from the DC power source 1 and the second transmission power amount transmitted to the DC power source 1 from the battery 2, which are both positive, are represented by one variable of the transmission power amount. Specifically, in the case of performing the first power transmission (charge of the battery 2), the first transmission power amount is directly set to the transmission power amount; and in the case of performing the second power transmission (discharge of the battery 2), a positive/negative inverting value of the second transmission power amount is set to the transmission power amount. That is, the transmission power amount increases from 0 to the positive direction, as the first transmission power amount increases from 0; and the transmission power amount increases from 0 to the negative direction (it decreases from 0), as the second transmission power amount increases from 0. The output DUTY ratio increases from 0 to the positive direction, as the first transmission power amount increases from 0; and the output DUTY ratio increases from 0 to the negative direction (it decreases from 0), as the second transmission power amount increases from 0. Therefore, in both of the first power transmission and the second power transmission, the transmission power amount and the output DUTY ratio are in proportional relationship.

<Change of Phase Shift Amount of First Power Transmission (Charge of Battery 2)>

First, the case of the first power transmission (charge of the battery 2) will be explained. As shown in the right half of the middle graph of FIG. 11, when the first transmission power amount (in this example, the output DUTY ratio) is between 0 and a first reference point P1 which is preliminarily set to a larger value than 0 (referred to also as the case of step-down charge), the control circuit 20 decreases the first phase shift amount θ1 and the second phase shift amount θ2 in the same amount, as the first transmission power amount (the output DUTY ratio) increases. When the first transmission power amount (the output DUTY ratio) is larger than the first reference point P1 (referred to also as the case of step-up charge), the control circuit 20 decreases the first phase shift amount θ1 and increases the second phase shift amount θ2 from the first phase shift amount θ1 and the second phase shift amount θ2 when the first transmission power amount is at the first reference point P1, as the first transmission power amount (the output DUTY ratio) increases.

In the present embodiment, the first reference point P1 is preliminarily set to the first transmission power amount (the output DUTY ratio) at which the first phase shift amount θ1 and the second phase shift amount θ2 become 25% of the switching periods Tsw.

When the first transmission power amount (the output DUTY ratio) is between 0 and the first reference point P1, the control circuit 20 decreases the first phase shift amount θ1 and the second phase shift amount θ2 from the maximum (in this example, 45% of the switching periods Tsw) to 25% of the switching periods Tsw with a constant first slope. When the first transmission power amount (the output DUTY ratio) is between the first reference point P1 and a double value of the first reference point P1, the control circuit 20 decreases the first phase shift amount θ1 with the same first slope from 25% of the switching periods Tsw to the minimum value (in this example, 5% of the switching periods Tsw), and increases the second phase shift amount θ2 from 25% of the switching periods Tsw to the maximum with the same first slope.

Figure 11:
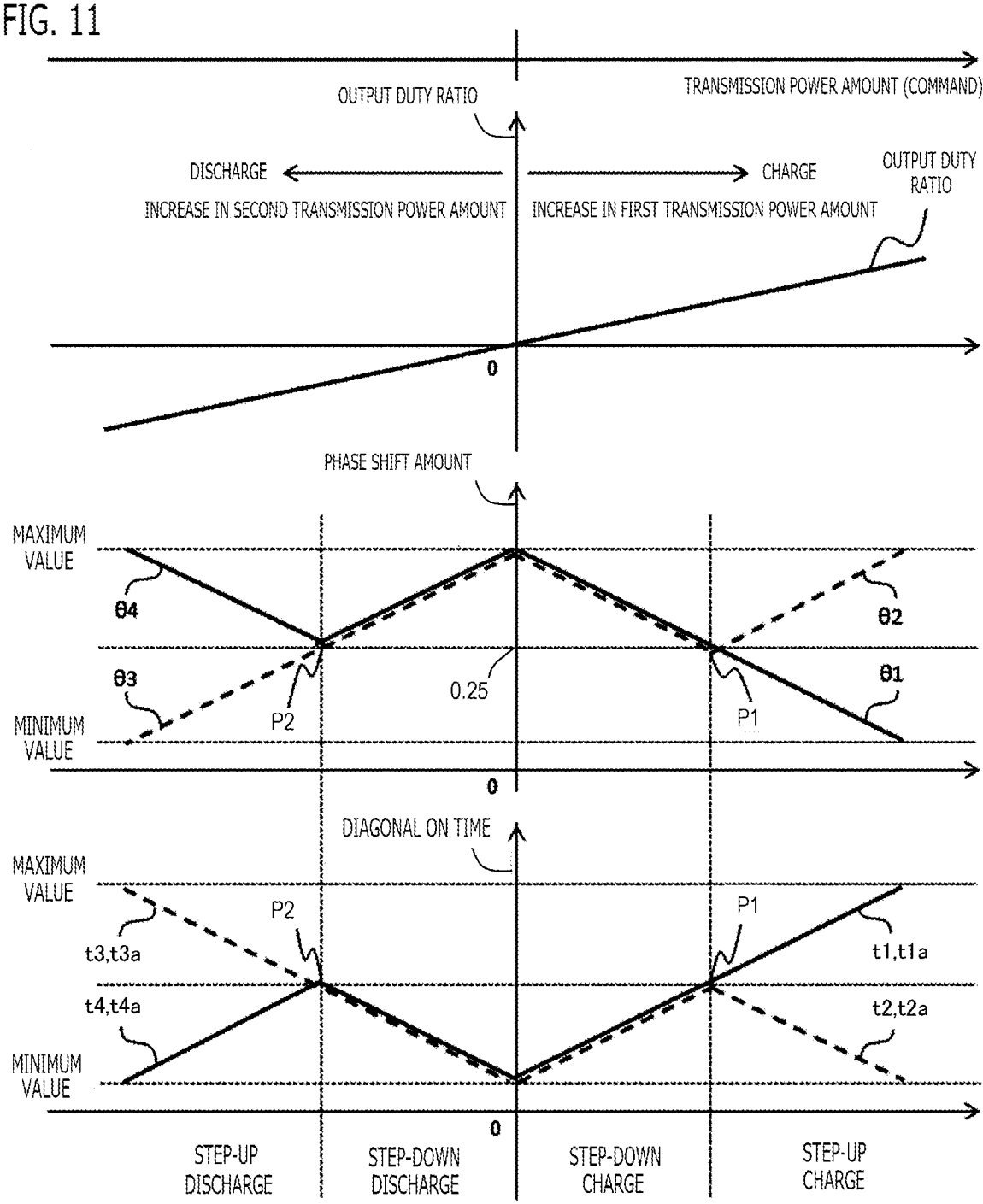
FIG. 11 is a figure showing a change of the phase shift amount based on the transmission power amount according to Embodiment 1.

The right half of the lower row graph of FIG. 11 shows change of the first diagonal ON time t1, t1a and the second virtual diagonal ON time t2, t2a at this time. As mentioned above, the first diagonal ON time t1, t1a become a value obtained by subtracting the first phase shift amount θ1 from the ON period of the first reference device QB1. The second virtual diagonal ON time t2, t2a become a value obtained by subtracting the second phase shift amount θ2 from the ON period of the first reference device QB1. Accordingly, in FIG. 11, the first diagonal ON time t1, t1a and the second virtual diagonal ON time t2, t2a are turned upside down to the first phase shift amount θ1 and the second phase shift amount θ2.

The first power transmission (charge of the battery 2) will be explained in detail. A period, during which electric power is transmitted to the second winding 3b from the first winding 3a of the transformer 3 and voltage is generated in the second winding 3b, becomes the first diagonal ON time t1, during which the first reference device QB1 (the positive electrode side first switching device Q4A) and the first diagonal device Q01 (the negative electrode side second switching device Q3B) are turned on simultaneously, and the first diagonal ON time t1a, during which the negative electrode side first switching device Q4B and the positive electrode side second switching device Q3A are turned on simultaneously.

In the step-down charge, the first diagonal ON time t1, t1a are adjusted by adjusting the first phase shift amount θ1 of the first converter 5, and the transmission power amount is adjusted. By changing the second phase shift amount θ2 of the second converter 8 so as to become the same amount as the first phase shift amount θ1, the second virtual diagonal ON time t2, t2a are coincided with the first diagonal ON time t1, t1a, and synchronous rectification operation is performed. A variation range of the first phase shift amount θ1 and the second phase shift amount θ2 in this step-down charge is a range from the maximum value to 25% of the switching periods Tsw. The maximum value is set to a value which is less than or equal to 50% of the switching periods Tsw, and larger than 25% of the switching period Tsw In the technology of PLT 1, in the step-up charge, in order to ensure the first diagonal ON time t1, t1a as long as possible, regardless of a change of the output DUTY ratio, the first phase shift amount θ1 is fixed to the minimum value, and the first diagonal ON time t1, t1a are fixed to the maximum value. Then, in the technology of PLT 1, in the step-up charge, as the output DUTY ratio increases, the second phase shift amount θ2 is gradually increased from the minimum value, and the second virtual diagonal ON times t2, t2a are gradually decreased. Therefore, in the technology of PLT 1, a change of phase difference between the first phase shift amount θ1 and the second phase shift amount θ2 to a change of the output DUTY ratio is small, and an adjustment amount of the transmission power amount becomes small.

On the other hand, in the present embodiment 1, as described above, in the step-up charge, as the output DUTY ratio increases, the first phase shift amount θ1 is gradually decreased from 25% of the switching periods Tsw to the minimum value, and the first diagonal ON time t1, t1a are gradually increased from a value corresponding to 25% to the maximum value; thereby, the excitation period of the first reactor 9 can be increased gradually. As the output DUTY ratio increases, the second phase shift amount θ2 is gradually increased from 25% of the switching periods Tsw to the maximum, and the second virtual diagonal ON times t2, t2a are gradually decreased from a value corresponding to 25% to the minimum value; thereby, the excitation period of the second reactor 10 during the first diagonal ON time t1, t1a can be increased gradually. Therefore, in the present embodiment 1, in the step-up charge, a change of phase difference between the first phase shift amount θ1 and the second phase shift amount θ2 to a change of the output DUTY ratio can be doubled compared with PLT 1; and the transmission power amount can be adjusted quickly.

Figure 12:
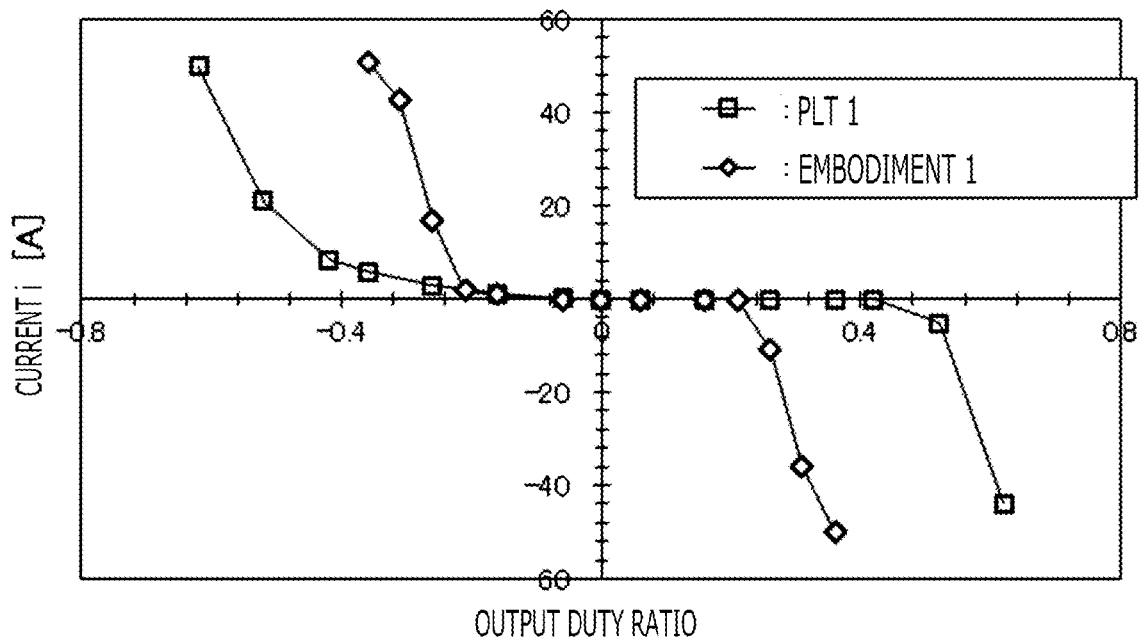
FIG. 12 is a figure showing a relation between the output DUTY ratio and current according to Embodiment 1.

FIG. 12 shows a relationship between the output DUTY ratio and the current i. For comparison, data based on the technology of PLT 1 is also shown. As shown in the right half of FIG. 12, in the present embodiment, in a region of the step-up charge, it is seen that a change of the current i to a change of the output DUTY ratio is large, and electric power can be adjusted quickly. Even compared with the technology of PLT 1, since a change of the current i to a change of the output DUTY ratio is large, the effect of the present embodiment can be verified. When the output DUTY ratio of the horizontal axis is 0.2, the first and the second phase shift amount θ1, θ2 is 25% of the switching periods Tsw corresponding to the first reference point P1.

Figure 13:
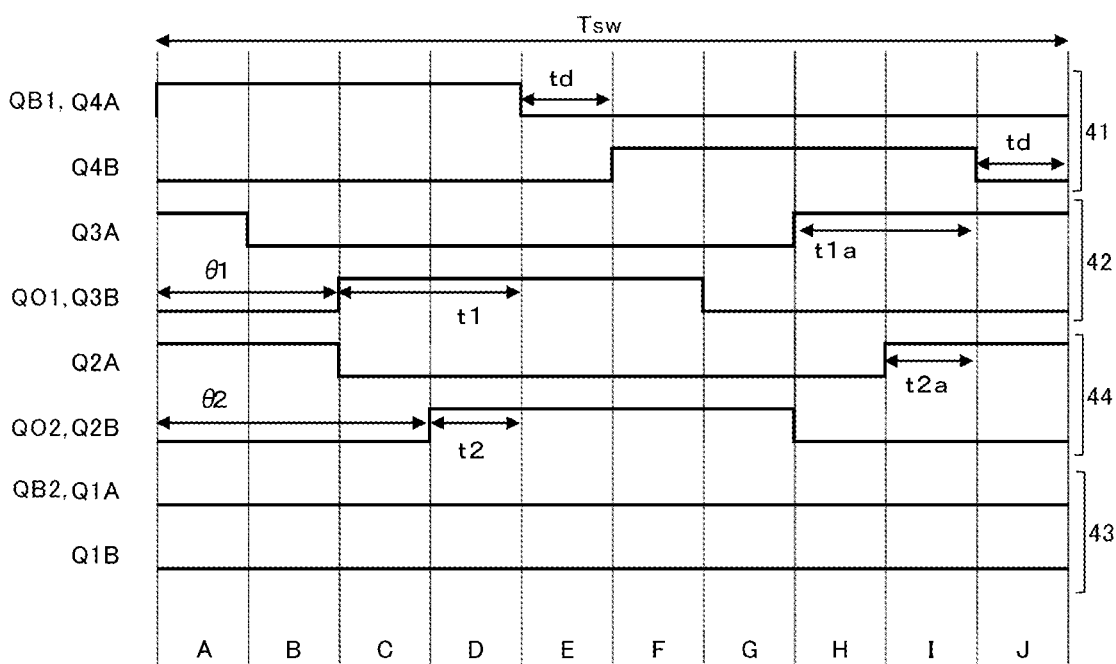
FIG. 13 is a time chart showing waveforms of the on-off driving signal of each switching device in the first power transmission (step-up charge) of the step-up operation according to Embodiment 1.

In the present embodiment, when changing between the step-down charge and the step-up charge, electric power can be adjusted quickly. This principle will be explained using FIG. 13. FIG. 13 shows time waveforms of the driving signal of each switching device in the step-up charge. In FIG. 13, since the output DUTY ratio becomes 0.24 which increased 0.04 from 0.2 at the first reference point P1, the first phase shift amount θ1 becomes 20% of the switching periods Tsw which decreased 5% from 25% at the first reference points P1, and the second phase shift amount θ2 becomes 30% of the switching periods Tsw which increased 5% from 25% at the first reference points P1. Accordingly, the phase difference between the first phase shift amount θ1 and the second phase shift amount θ2 becomes 10% of the switching periods Tsw, and is equal to the short circuit prevention time td.

In FIG. 13, in the period C, in the first converter 5, it is immediately after the negative electrode side second switching device Q3B (the first diagonal device Q01) is turned on, the positive electrode side first switching device Q4A (the first reference device QB1) and the negative electrode side second switching device Q3B (the first diagonal device Q01) are turned on simultaneously, and the diagonal two devices are electrically conducted. Therefore, via the positive electrode side first switching device Q4A and the negative electrode side second switching device Q3B, energy is transmitted to the first reactor 9 from the DC power source 1 side, and the first reactor 9 is excited.

Since the phase difference between the first phase shift amount θ1 and the second phase shift amount θ2 is equal to the short circuit prevention time td, in the second converter 8, the period C is the short circuit prevention time td of the fourth switching devices Q2A, Q2B, and the positive electrode side fourth switching device Q2A is not turned on. Accordingly, in the period C, current flows into the battery 2 side via the inverse parallel diode 12 of the positive electrode side third switching device Q1A, and the inverse parallel diode 12 of the negative electrode side fourth switching device Q2B. Accordingly, the second reactor 10 is not excited. Therefore, although FIG. 13 shows the case of the step-up charge in which the first transmission power amount becomes larger than the first reference point P1, since the phase difference between the first phase shift amount θ1 and the second phase shift amount θ2 does not increase until it still exceeds the short circuit prevention time td, the step-up operation does not occur.

Figure 14:
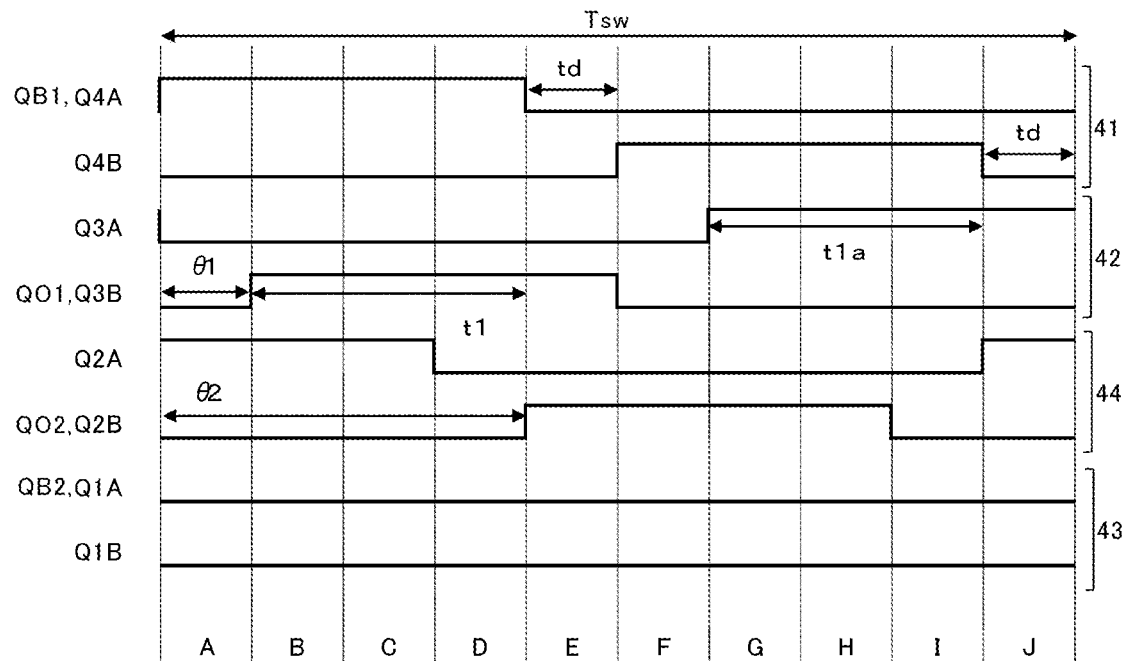
FIG. 14 is a time chart showing waveforms of the on-off driving signal of each switching device in the first power transmission (step-up charge) of the step-up operation according to Embodiment 1.

FIG. 14 shows the case where the phase difference between the first phase shift amount θ1 and the second phase shift amount θ2 becomes larger than the short circuit prevention time td, and the step-up operation occurs. In FIG. 14, since the output DUTY ratio becomes 0.32 which increased 0.12 from 0.2 at the first reference point P1, the first phase shift amount θ1 becomes 10% of the switching periods Tsw which decreased 15% from 25% at the first reference points P1, and the second phase shift amount θ2 becomes 40% of the switching periods Tsw which increased 15% from 25% at the first reference points P1. Accordingly, the phase difference between the first phase shift amount θ1 and the second phase shift amount θ2 becomes 30% of the switching periods Tsw, and becomes triple of the short circuit prevention time td.

In the period B in FIG. 4, in the first converter 5, the positive electrode side first switching device Q4A (the first reference device QB1) and the negative electrode side second switching device Q3B (the first diagonal device Q01) are turned on simultaneously, and diagonal two devices are electrically conducted. Accordingly, energy is transmitted to the first reactor 9 from the DC power source 1 side, and the first reactor 9 is excited.

In this period B, in the second converter 8, the positive electrode side fourth switching device Q2A is turned on. Accordingly, current recirculates to the second reactor 10 via the positive electrode side fourth switching device Q2A and the inverse parallel diode 12 of the positive electrode side third switching device Q1A, and the second reactor 10 is excited. Therefore, in the period B, the first reactor 9 and the second reactor 10 are excited, and the step-up operation of the second reactor 10 occurs.

Since the period C is the same state as the period B, excitation of the first reactor 9 and the second reactor 10 is continued. In the period D, since the first converter 5 is in the same state as the period B and the period C, excitation of the first reactor 9 is continued. On the other hand, in the second converter 8, since the period D corresponds to the short circuit prevention time td, the positive electrode side fourth switching device Q2A is turned off, and current flows into the battery 2 side via the inverse parallel diode 12 of the positive electrode side third switching device Q1A, and the inverse parallel diode 12 of the negative electrode side fourth switching device Q2B. Accordingly, in the period D, the excitation energy of the first reactor 9 and the second reactor 10 is transmitted to the battery 2 side. Therefore, FIG. 14 shows charge (step-up charge) of the battery 2 with the step-up operation of the second reactor 10.

Thus, the step-up operation of the second reactor 10 is performed in a period obtained by subtracting the short circuit prevention time td from the phase difference between the first phase shift amount θ1 and the second phase shift amount θ2. A change of this phase difference is proportional to double of a change of the output DUTY ratio. Therefore, the change to the step-up operation from the step-down operation can be realized by half change of the output DUTY ratio as compared with the case of PLT 1. Accordingly, as shown in FIG. 12, a change of current to a change of the output DUTY ratio becomes steep.

<Change of Phase Shift Amount of Second Power Transmission (Discharge of Battery 2)>

Next, the case of the second power transmission (discharge of the battery 2) will be explained. As shown in FIG. 1, since the circuit configuration of the battery charge and discharge device 100 is symmetrical while sandwiching the reactor 11, the control operation becomes symmetrical between the first power transmission and the second power transmission as shown in FIG. 11.

As shown in the left half of the upper row graph of FIG. 11, in the case of the second power transmission, as mentioned above, the output DUTY ratio increases to the negative direction as the second transmission power amount increases. That is, positive and negative signs are reversed between the second transmission power amount and the output DUTY ratio.

As shown in the left half of the middle graph of FIG. 11, when the second transmission power amount (positive/negative inverting value of the output DUTY ratio) is between 0 and a second reference point P2 which is preliminarily set to a larger value than 0 (referred to also as the case of step-down discharge), the control circuit 20 decreases the third phase shift amount θ3 and the fourth phase shift amount θ4 in the same amount, as the second transmission power amount (positive/negative inverting value of the output DUTY ratio) increases. When the second transmission power amount (positive/negative inverting value of the output DUTY ratio) is larger than the second reference point P2 (referred to also as the case of step-up discharge), the control circuit 20 decreases the third phase shift amount θ3 and increases the fourth phase shift amount θ4 from the third phase shift amount θ3 and the fourth phase shift amount θ4 when the second transmission power amount is at the second reference point P2, as the second transmission power amount (positive/negative inverting value of the output DUTY ratio) increases.

In the present embodiment, the second reference point P2 is preliminarily set to the second transmission power amount (positive/negative inverting value of the output DUTY ratio) at which the third phase shift amount θ3 and the fourth phase shift amount θ4 become 25% of the switching periods Tsw.

When the second transmission power amount (positive/negative inverting value of the output DUTY ratio) is between 0 and the second reference point P2, the control circuit 20 decreases the third phase shift amount θ3 and the fourth phase shift amount θ4 from the maximum to 25% of the switching periods Tsw with a constant second slope. When the second transmission power amount (positive/negative inverting value of the output DUTY ratio) is between the second reference point P2 and a double value of the second reference point P2, the control circuit 20 decreases the third phase shift amount θ3 from 25% of the switching period Tsw to the minimum value with the same second slope, and decreases the fourth phase shift amount θ4 from 25% of the switching periods Tsw to the maximum with the same second slope.

The left half of the lower row graph of FIG. 1 shows change of the third diagonal ON time t3, t3a and the fourth virtual diagonal ON time t4, t4a at this time. As mentioned above, the third diagonal ON times t3, t3a become a value obtained by subtracting the third phase shift amount θ3 from the ON period of the second reference device QB2, and the fourth virtual diagonal ON times t4, t4a become a value obtained by subtracting the fourth phase shift amount θ4 from the ON period of the second reference device QB2. Accordingly, the third diagonal ON time t3, t3a and the fourth virtual diagonal ON time t4, t4a are turned upside down to the third phase shift amount θ3 and the fourth phase shift amount θ4.

In FIG. 11, since both the first phase shift amount θ1 in the charge and the fourth phase shift amount θ4 in the discharge are a phase shift amount of the first diagonal device Q01 (the negative electrode side second switching device Q3B), they are continuously drawn with the same solid line. Since both the second phase shift amount θ2 in the charge and the third phase shift amount θ3 in the discharge are a phase shift amount of the second diagonal device QO2 (the negative electrode side fourth switching device Q2B), they are continuously drawn with the same dotted line. Similarly, the first diagonal ON time t1 and the fourth virtual diagonal ON time t4 are continuously drawn with the same solid line, and the second virtual diagonal ON time t2 and the third diagonal ON time t3 are continuously drawn with the same dotted line.

Figure 15:
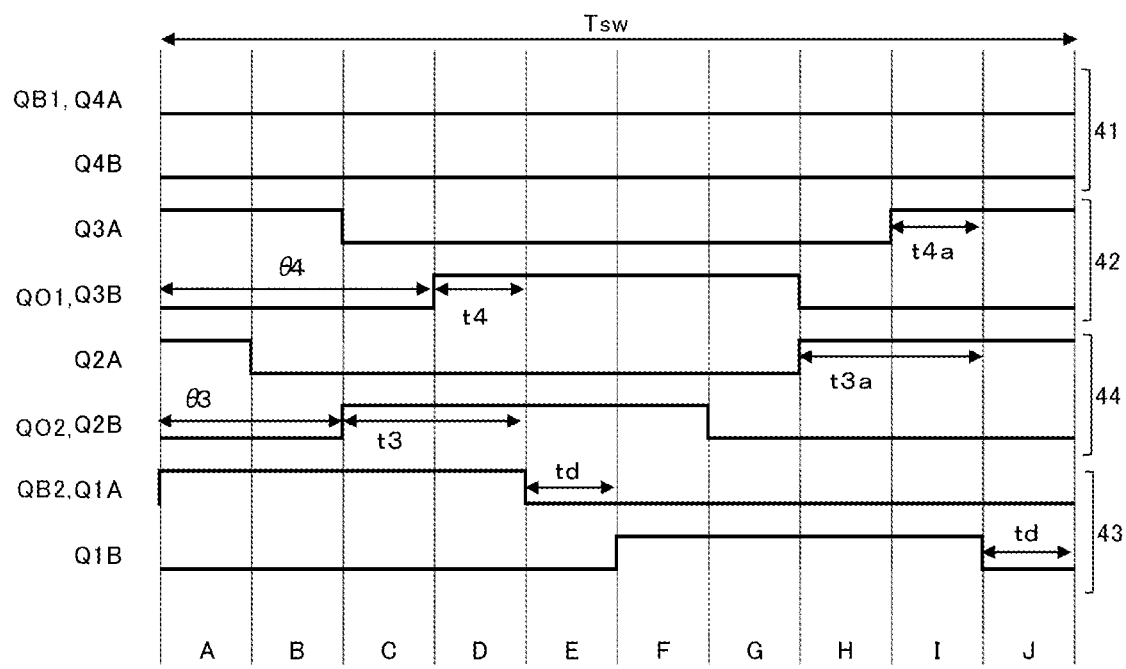
FIG. 15 is a time chart showing waveforms of the on-off driving signal of each switching device in the second power transmission (step-up discharge) of the step-up operation according to Embodiment 1.

FIG. 15 shows time waveforms of the driving signal of each switching device in the step-up discharge corresponding to FIG. 13 in the step-up charge. In FIG. 15, since the output DUTY ratio becomes −0.24 which decreased 0.04 from −0.2 at the second reference point P2, the third phase shift amount θ3 becomes 20% of the switching periods Tsw which decreased 5% from 25% at the second reference points P2, and the fourth phase shift amount θ4 becomes 30% of the switching periods Tsw which increased 5% from 25% at the second reference points P2. Accordingly, the phase difference between the third phase shifts amount θ3 and the fourth phase shift amount θ4 becomes 10% of the switching periods Tsw, and is equal to the short circuit prevention time td.

The on-off driving signal of each switching device in the step-up discharge shown in FIG. 15 corresponds to signal obtained by replacing the on-off driving signal of the first switching devices Q4A, Q4B and the on-off driving signal of the third switching devices Q1A, Q1B in the step-up charge shown in FIG. 13; and corresponds to signal obtained by replacing the on-off driving signal of the second switching device Q3A, Q3B and the on-off driving signal of the fourth switching device Q2A, Q2B in the step-up charge shown in FIG. 13. Accordingly, FIG. 15 becomes the similar operation as the case of FIG. 13. That is to say, although FIG. 15 shows the case of the step-up discharge in which the second transmission power amount becomes larger than the second reference point P2, since the phase difference between the third phase shift amount θ3 and the fourth phase shift amount θ4 does not increase until it still exceeds the short circuit prevention time td, the step-up operation of the first reactor 9 does not occur.

Figure 16:
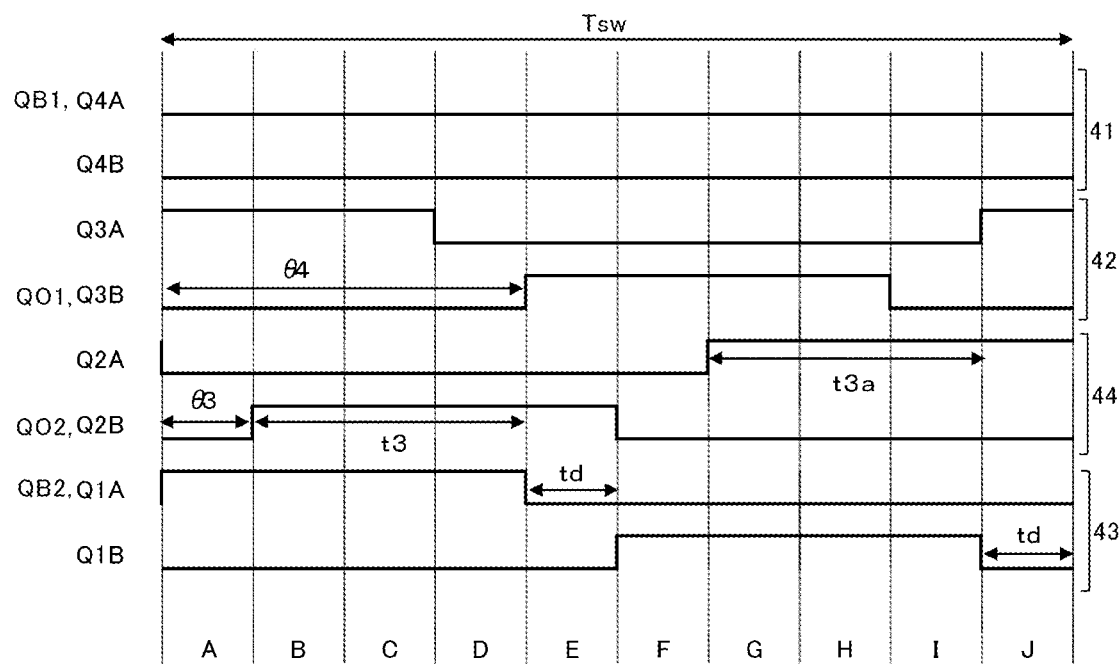
FIG. 16 is a time chart showing waveforms of the on-off driving signal of each switching device in the second power transmission (step-up discharge) of the step-up operation according to Embodiment 1.

FIG. 16 shows time waveforms of the driving signal of each switching device in the step-up discharge corresponding to FIG. 14 in the step-up charge. In FIG. 16, since the output DUTY ratio becomes −0.32 which decreased 0.12 from −0.2 at the first reference point P1, the third phase shift amount θ3 becomes 10% of the switching periods Tsw which decreased 15% from 25% at the second reference points P2, and the fourth phase shift amount θ4 becomes 40% of the switching periods Tsw which increased 15% from 25% at the second reference points P2. Accordingly, the phase difference between the third phase shifts amount θ3 and the fourth phase shift amount θ4 becomes 30% of the switching periods Tsw, and is triple of the short circuit prevention time td.

The on-off driving signal of each switching device in the step-up discharge shown in FIG. 16 corresponds to signal obtained by replacing the on-off driving signal of the first switching devices Q4A, Q4B and the on-off driving signal of the third switching devices Q1A, Q1B in the step-up charge shown in FIG. 14; and corresponds to signal obtained by replacing the on-off driving signal of the second switching device Q3A, Q3B and the on-off driving signal of the fourth switching device Q2A, Q2B in the step-up charge shown in FIG. 14. Accordingly, FIG. 16 becomes the similar operation as the case of FIG. 14. That is, in FIG. 16, the phase difference between the third phase shift amount θ3 and the fourth phase shift amount θ4 increase until it exceeds the short circuit prevention time td, and the step-up operation of the first reactor 9 occurs.

Therefore, the step-up operation of the first reactor 9 is performed in a period obtained by subtracting the short circuit prevention time td from the phase difference between the third phase shift amount θ3 and the fourth phase shift amount θ4. A change of this phase difference is proportional to double of a change of the output DUTY ratio. Therefore, also in the discharge, the change to the step-up operation from the step-down operation can be realized by half change of the output DUTY ratio as compared with the case of PLT 1. Accordingly, as shown in the left half of FIG. 12, also in the discharge, a change of current to a change of the output DUTY ratio becomes steep, as compared with the technology of PLT 1.

As described above, the battery charge and discharge device 100 according to the present embodiment can control the current i by small change of the output DUTY ratio; power control with high readiness is possible, and bidirectional power transmission in a wide voltage range is possible.

Embodiment 2

Next, the battery charge and discharge device 100 according to Embodiment 2 will be explained. The explanation for constituent parts the same as those in Embodiment 1 will be omitted. The basic configuration and processing of the battery charge and discharge device 100 according to the present embodiment is the same as that of Embodiment 1; however, Embodiment 2 is different from Embodiment 1 in change of the phase shift amount based on the transmission power amount.

Figure 17:
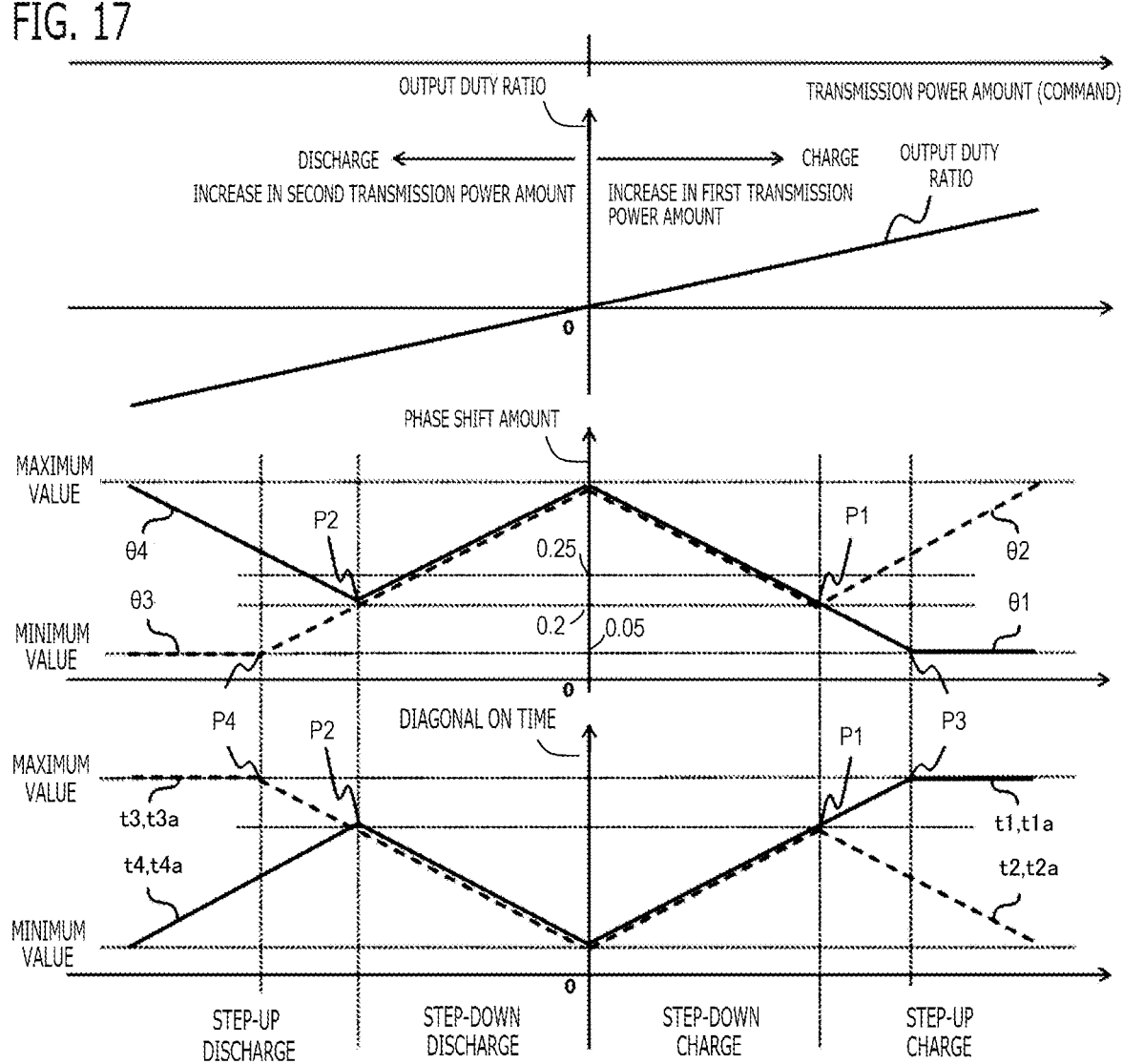
FIG. 17 is a figure showing a change of the phase shift amount based on the transmission power amount according to Embodiment 2.

The phase shift amount based on the transmission power amount according to the present embodiment will be explained using FIG. 17. Since the upper row graph of FIG. 17 is the same as the upper row graph of FIG. 11, explanation will be omitted.

<Change of Phase Shift Amount of First Power Transmission (Charge of Battery 2)>

First, the case of the first power transmission (charge of the battery 2) according to the present embodiment will be explained. As shown in the right half of the middle graph of FIG. 17, when the first transmission power amount (in this example, the output DUTY ratio) is between 0 and a first reference point P1 which is preliminarily set to a larger value than 0, the control circuit 20 decreases the first phase shift amount $\theta 1$ and the second phase shift amount $\theta 2$ in the same amount, as the first transmission power amount (the output DUTY ratio) increases.

When the first transmission power amount (the output DUTY ratio) is between the first reference point P1 and the third reference point P3 which is preliminarily set to a larger value than the first reference point P1, the control circuit 20 decreases the first phase shift amount $\theta 1$ and increases the second phase shift amount $\theta 2$ from the first phase shift amount $\theta 1$ and the second phase shift amount $\theta 2$ when the first transmission power amount is at the first reference point P1, as the first transmission power amount (the output DUTY ratio) increases.

When the first transmission power amount (the output DUTY ratio) is larger than the third reference point P3, the control circuit 20 increases the second phase shift amount $\theta 2$ from the second phase shift amount $\theta 2$ when the first transmission power amount is at the third reference point P3 and maintains the first phase shift amount $\theta 1$ at the first phase shift amount $\theta 1$ when the first transmission power amount is at the third reference point P3, as the first transmission power amount (the output DUTY ratio) increases.

An interval where the first transmission power amount (the output DUTY ratio) is between 0 and the first reference point P1 is an interval for performing the step-down charge; and an interval where the first transmission power amount (the output DUTY ratio) is larger than the first reference point P1 is an interval for performing the step-up charge.

In the present embodiment, the first reference point P1 is preliminarily set to the first transmission power amount (the output DUTY ratio) at which the first phase shift amount $\theta 1$ and the second phase shift amount $\theta 2$ become a preliminarily set value smaller than 25% of the switching period Tsw (in this example, 20% of the switching periods Tsw). The third reference point P3 is preliminarily set to the first transmission power amount (output DUTY ratio) which becomes 5% of the switching periods Tsw.

When the first transmission power amount (the output DUTY ratio) is between 0 and the first reference point P1, the control circuit 20 decreases the first phase shift amount $\theta 1$ and the second phase shift amount $\theta 2$ from the maximum (in this example, 45% of the switching periods Tsw) to 20% of the switching periods Tsw with a constant first slope. When the first transmission power amount (the output DUTY ratio) is between the first reference point P1 and the third reference point P3, the control circuit 20 decreases the first phase shift amount $\theta 1$ with the same first slope from 20% of the switching periods Tsw to the minimum value (in this example, 5% of the switching periods Tsw), and increases the second phase shift amount $\theta 2$ from 25% of the switching periods Tsw with the same first slope. When the first transmission power amount (the output DUTY ratio) is between the first reference point P1 and a double value of the third reference point P3, the control circuit 20 fixes the first phase shift amount $\theta 1$ to the minimum value, and continuously increases the second phase shift amount $\theta 2$ to the maximum with the same first slope.

As shown in the right half of the lower row graph of FIG. 17, the first diagonal ON time t1, t1a and the second virtual diagonal ON time t2, t2a are turned upside down to the first phase shift amount $\theta 1$ and the second phase shift amount $\theta 2$.

<Change of Phase Shift Amount of Second Power Transmission (Discharge of Battery 2)>

Next, the case of the second power transmission (discharge of the battery 2) will be explained. As shown in the left half of the middle graph of FIG. 17, when the second transmission power amount (positive/negative inverting value of the output DUTY ratio) is between 0 and the second reference point P2 which is preliminarily set to a larger value than 0, the control circuit 20 decreases the third phase shift amount $\theta 3$ and the fourth phase shift amount $\theta 4$ in the same amount, as the second transmission power amount (positive/negative inverting value of the output DUTY ratio) increases.

When the second transmission power amount (positive/negative inverting value of the output DUTY ratio) is between the second reference point P2 and the fourth reference point P4 which is preliminarily set to a larger value than the second reference point P2, the control circuit 20 decreases the third phase shift amount $\theta 3$ and increases the fourth phase shift amount $\theta 4$ from the third phase shift amount $\theta 3$ and the fourth phase shift amount $\theta 4$ when the second transmission power amount is at the second reference point P2, as the second transmission power amount (positive/negative inverting value of the output DUTY ratio) increases.

When the second transmission power amount (positive/negative inverting value of the output DUTY ratio) is larger than the fourth reference point P4, the control circuit 20 increases the fourth phase shift amount $\theta 4$ from the fourth phase shift amount $\theta 4$ when the second transmission power amount is at the fourth reference point P4 and maintains the third phase shift amount $\theta 3$ at the third phase shift amount $\theta 3$ when the second transmission power amount is at the fourth reference point P4, as the second transmission power amount (positive/negative inverting value of the output DUTY ratio) increases.

An interval where the second transmission power amount (positive/negative inverting value of the output DUTY ratio) is between 0 and the second reference point P2 is an interval for performing the step-down discharge; and an interval where the second transmission power amount (positive/negative inverting value of the output DUTY ratio) is larger than the second reference point P2 is an interval for performing the step-up discharge.

In the present embodiment, the second reference point P2 is preliminarily set to the second transmission power amount (positive/negative inverting value of the output DUTY ratio)

at which the third phase shift amount θ3 and the fourth phase shift amount θ4 become a preliminarily set value smaller than 25% of the switching period Tsw (in this example, 20% of the switching periods Tsw). The fourth reference point P4 is preliminarily set to the second transmission power amount (positive/negative inverting value of the output DUTY ratio) which becomes 5% of the switching periods Tsw.

When the second transmission power amount (positive/negative inverting value of the output DUTY ratio) is between 0 and the second reference point P2, the control circuit 20 decreases the third phase shift amount θ3 and the fourth phase shift amount θ4 with the constant second slope from the maximum (in this example, 45% of the switching periods Tsw) to 20% of the switching periods Tsw. When the second transmission power amount (positive/negative inverting value of the output DUTY ratio) is between the second reference point P2 and the fourth reference point P4, the control circuit 20 decreases the third phase shift amount θ3 with the same second slope from 20% of the switching period Tsw to the minimum value (in this example, 5% of the switching periods Tsw), and increases the fourth phase shift amount θ4 with the same second slope from 25% of the switching periods Tsw. When the second transmission power amount (positive/negative inverting value of the output DUTY ratio) is between the fourth reference point P4 and a double value of the second reference point P2, the control circuit 20 fixes the third phase shift amount θ3 to the minimum value, and continuously increases the fourth phase shift amount θ4 to the maximum with the same second slope.

As shown in the left half of the lower row graph of FIG. 17, the third diagonal ON time t3, t3a and the fourth virtual diagonal ON time t4, t4a are turned upside down to the third phase shift amount θ3 and the fourth phase shift amount θ4.

As mentioned above, in the present embodiment, compared with Embodiment 1, a range of the output DUTY ratio which becomes the step-down charge or the step-down discharge expands, and a range of the output DUTY which becomes the step-up charge or the step-up discharge expands similarly. Accordingly, a control operation of each phase shift amount θ1 to θ4 to the output DUTY ratio becomes a control operation having both of feature of control operation of Embodiment 1 shown in FIG. 11, and feature of control operation of PLT 1 that fixes the diagonal ON times t1, t1a, t3, t3a of the diagonal devices, which become transmission side of electric power in the step-up, to the maximum value.

Figure 18:
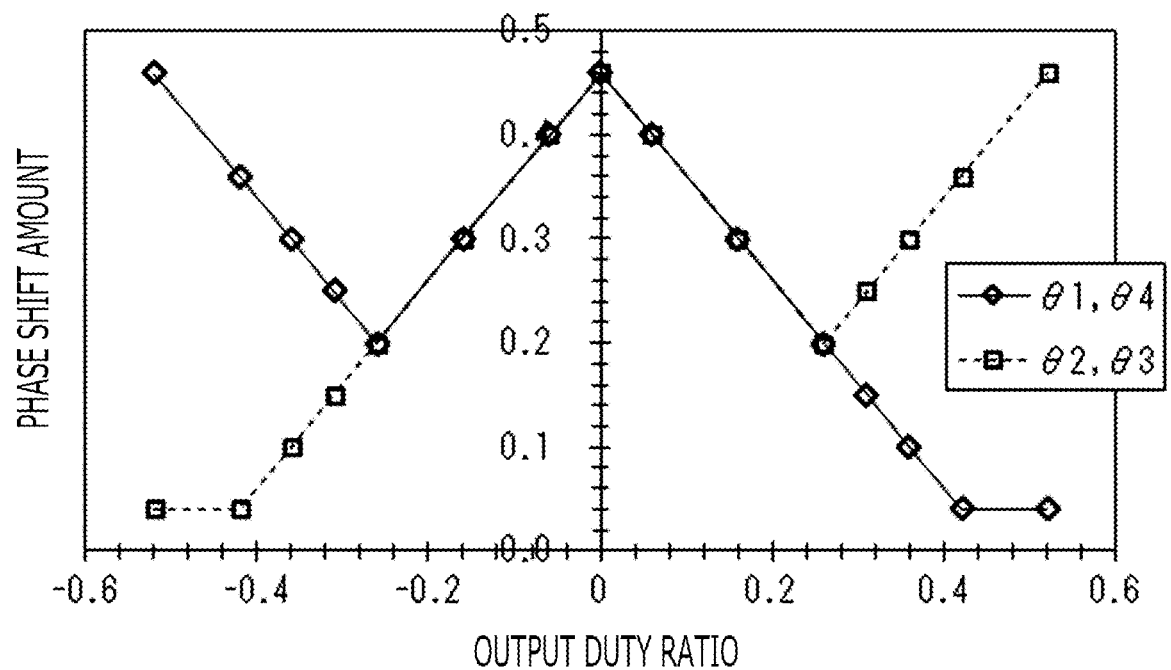
FIG. 18 is a figure showing a change of the phase shift amount based on the output DUTY ratio according to Embodiment 2.

FIG. 18 shows an example of control operation of each phase shift amount θ1 to θ4 to the output DUTY ratio in the present embodiment. At the first reference point P1, the output DUTY ratio is set to 0.26 and the first phase shift amount θ1 and the second phase shift amount θ2 are set to 0.2; and at the second reference point P2, the output DUTY ratio is set to −0.26 and the third phase shift amount θ3 and the fourth phase shift amount θ4 are set to 0.2.

Figure 19:
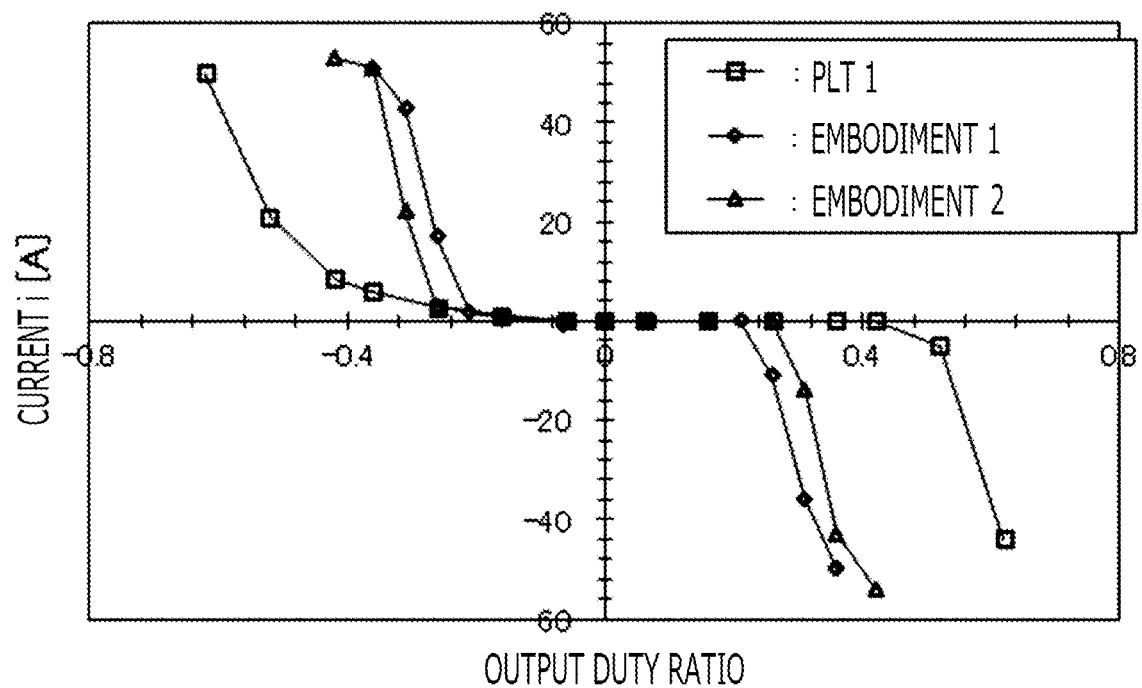
FIG. 19 is a figure showing a relation between the output DUTY ratio and current according to Embodiment 2.

FIG. 19 shows a relationship between the output DUTY ratio and the current i in the case of FIG. 18. For comparison, data based on the technology of PLT 1 and Embodiment 1 is also shown. In FIG. 19, the current i by Embodiment 2 is obtained by control operation shown in FIG. 18. In the present embodiment, as similar to Embodiment 1, in a region of the step-up charge and the step-up discharge, it is seen that a change of the current i to a change of the output DUTY ratio is large, and electric power can be adjusted quickly. In particular, as compared with the technology of PLT 1, a change of the current i to a change of the output DUTY ratio becomes large. Even though it compares with Embodiment 1, a large difference does not occur. Therefore, power control of the battery charge and discharge device 100 with high readiness is also possible in the present embodiment.

Figure 20:
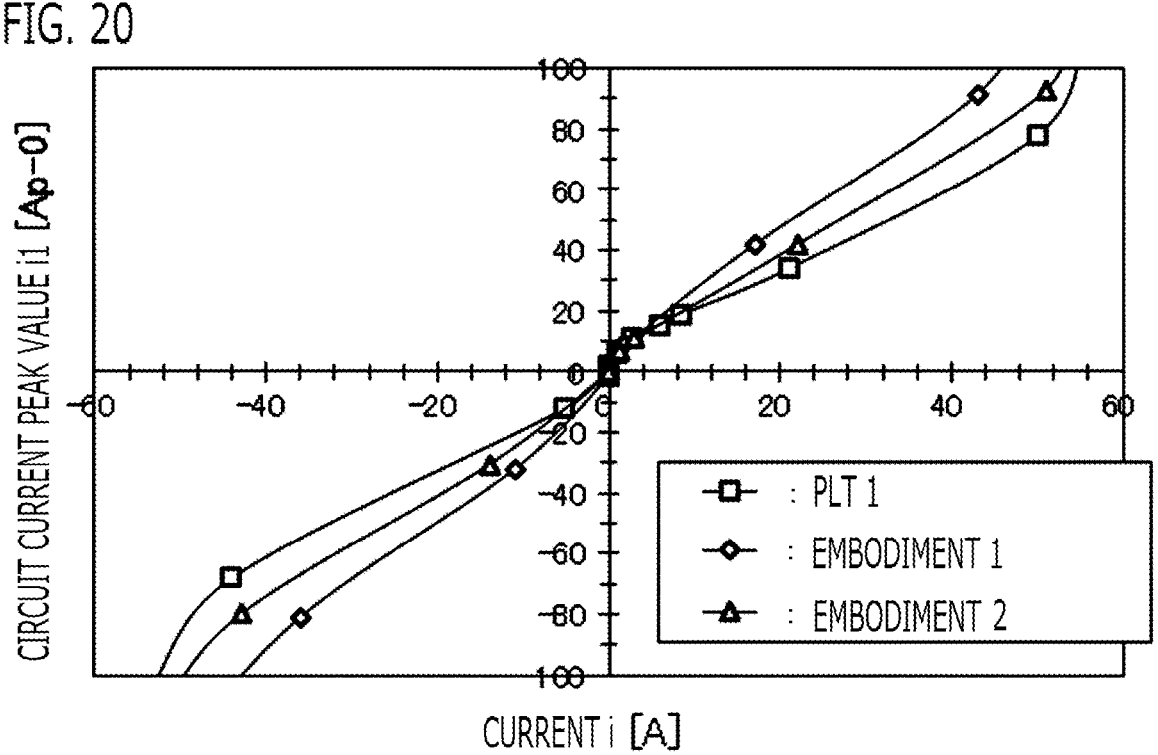
FIG. 20 is a figure showing a relation between the current and the circuit current peak value according to Embodiment 2.

FIG. 20 shows a relationship between the current i and the circuit current peak value i1. The circuit current peak value i1 is the maximum value in the half period 0 to 50% of the switching period Tsw, in the current which flows through the first winding 3a of the transformer 3. Since the direction of current is reversed between the charging operation and the discharge operation, it is distinguished by positive/negative. For comparison, data based on the technology of PLT 1 and Embodiment 1 is also shown. The plotting points are connected with the solid line in order to understand visually.

FIG. 20 shows how much circuit current peak value i1 is necessary in order to obtain a certain current i; and when obtaining a certain current i, the smaller the circuit current peak value i1 (absolute value) is, the smaller the load to components of the battery charge and discharge device 100 is. Specifically, the larger the circuit current peak value i1 (absolute value) is, the more the component loss which occurs in each component, such as the transformer 3, the switching devices, and the reactors, tends to increase; and it may be necessary to enlarge each component for loss reduction. Although the circuit current peak value i1 (absolute value) of the present embodiment is larger than PLT 1, it is smaller than Embodiment 1. Therefore, in the present embodiment, as compared with Embodiment 1, the load to the components of the battery charge and discharge device 100 is small; and as compared with PLT 1, the power control of the battery charge and discharge device 100 with high readiness is possible.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(2) In each of the above-mentioned Embodiments, there has been explained the case where the positive electrode side first switching device Q4A in the first bridge circuit 41 is set to the first reference device QB1, the negative electrode side second switching device Q3B in the second bridge circuit 42 is set to the first diagonal device QO1, the positive electrode side third switching device Q1A in the third bridge circuit 43 is set to the second reference device QB2, and the negative electrode side fourth switching device Q2B in the fourth bridge circuit 44 is set to the second diagonal device QO2. However, embodiments of the present disclosure are not limited to the foregoing case. That is to say, the negative electrode side first switching device Q4B in the first bridge circuit 41 may be set to the first reference device QB1, the positive electrode side second switching device Q3A in the second bridge circuit 42 may be set to the first diagonal device QO1, the negative electrode side third switching device Q1B in the third bridge circuit 43 may be set to the second reference device QB2, and the positive electrode side fourth switching device Q2A in the fourth bridge circuit 44 may be set to the second diagonal device QO2.

(2) In each of the above-mentioned Embodiments, there has been explained the case where in the first converter 5 of FIG. 1, the bridge circuit of left side is the first bridge circuit 41 where the first reference device QB1 is set, and the bridge circuit of right side is the second bridge circuit 42 where the first diagonal device QO1 is set; and in the second converter 8 of FIG. 1, the bridge circuit of right side is the third bridge circuit 43 where the second reference device QB2 is set, and the bridge circuit of left side is the fourth bridge circuit 44 where the second diagonal device Q02 is set. However, embodiments of the present disclosure are not limited to the foregoing case. That is to say, in the first converter 5 of FIG. 1, the bridge circuit of right side may be the first bridge circuit 41 where the first reference device QB1 is set, and the bridge circuit of left side may be the second bridge circuit 42 where the first diagonal device Q01 is set; in the second converter 8 of FIG. 1, the bridge circuit of left side may be the third bridge circuit 43 where the second reference device QB2 is set, and the bridge circuit of right side may be the fourth bridge circuit 44 where the second diagonal device Q02 is set.

(3) In each of the above-mentioned Embodiments, there has been explained the case where the second DC power source 2 is the battery 2. However, embodiments of the present disclosure are not limited to the foregoing case. That is to say, the first DC power source 1 and the second DC power source 2 may be any DC power source, respectively. For example, as a DC power source, a battery, a rotary electric machine with both functions of an electric generator and an electric motor, and the like are used.

(4) In each of the above-mentioned Embodiments, there has been explained the case where in each FIG, such as FIG. 4 explaining the time waveforms of the driving signal of each switching device, the switching period Tsw is divided in 10 periods of periods A to J; to each period A to J, a gate pattern which is a combination pattern of on or off driving signal of each switching element is set; and the short circuit prevention time td is equal to one period. However, embodiments of the present disclosure are not limited to the foregoing case. That is to say, the switching period Tsw may be divided in any numbers of periods; alternatively, the switching period Tsw is not divided in plural periods, but each phase shift amount θ1 to θ4 may be changed more continuously, and the short circuit prevention time td may be set to any period.

(5) In the above-mentioned Embodiment 1, there has been explained the case where the first reference point P1 is preliminarily set to the first transmission power amount at which the first phase shift amount θ1 and the second phase shift amount θ2 become 25% of the switching periods Tsw; and the second reference point P2 is preliminarily set to the second transmission power amount at which the third phase shift amount θ3 and the fourth phase shift amount θ4 become 25% of the switching periods Tsw. In the above-mentioned Embodiment 2, there has been explained the case where the first reference point P1 is preliminarily set to the first transmission power amount at which the first phase shift amount θ1 and the second phase shift amount θ2 become a preliminarily set value smaller than 25% of the switching period Tsw; and the second reference point P2 is preliminarily set to the second transmission power amount at which the third phase shift amount θ3 and the fourth phase shift amount θ4 become a preliminarily set value smaller than 25% of the switching period Tsw. However, embodiments of the present disclosure are not limited to the foregoing case. That is to say, the first reference point P1 may be preliminarily set to the first transmission power amount at which the first phase shift amount θ1 and the second phase shift amount θ2 become any % from 0% to 50% of the switching period Tsw; and the second reference point P2 may be preliminarily set to the second transmission power amount at which the third phase shift amount θ3 and the fourth phase shift amount θ4 may become any % from 0% to 50% of the switching period Tsw. The first reference point P1 and the second reference point P2 may be set to the transmission power amounts corresponding to mutually different phase shift amounts.

(6) In each of the above-mentioned Embodiments, there has been explained the case where each phase shift amount θ1, θ2, θ3, θ4 increases or decreases with the same slope to an increase or decrease of the transmission power amount (the output DUTY ratio). However, embodiments of the present disclosure are not limited to the foregoing case. That is to say, slope of each phase shift amount θ1, θ2, θ3, θ4 may be changed according to operating point of the transmission power amount (the output DUTY ratio). In the step-up charge, the first phase shift amount θ1 and the second phase shift amount θ2 may increase or decrease with mutually different slopes; and in the step-up discharge, the third phase shift amount θ3 and the fourth phase shift amount θ4 may increase or decrease with mutually different slopes.

Various modifications and alterations of this disclosure will be apparent to those skilled in the art without departing from the scope and spirit of this disclosure, and it should be understood that this is not limited to the illustrative embodiments set forth herein.

INDUSTRIAL APPLICABILITY

The present disclosure can be preferably used for a DC/DC converter which performs bidirectional power transmission between a first DC power source and a second DC power source.

REFERENCE SIGNS LIST

θ1: First Phase Shift Amount, θ2: Second Phase Shift Amount, θ3: Third Phase Shift Amount, θ4: Fourth Phase Shift Amount, 1: DC Power Source (First DC Power Source), 2: Battery (Second DC Power Source), 3: Transformer, 3a: First Winding, 3b: Second Winding, 5: First Converter, 8: Second Converter, 9: First Reactor, 10: Second Reactor, 12: Inverse Parallel Diode (Diode), 13: Parallel Capacitor (Capacitor), 20: Control Circuit, 41: First Bridge Circuit, 42: Second Bridge Circuit, 43: Third Bridge Circuit, 44: Fourth Bridge Circuit, 50: First Positive Electrode wire, 51: First Negative Electrode wire, 52: Second Positive Electrode wire, 53: Second Negative Electrode wire, 100: Battery Charge and Discharge Device (DC/DC Converter), P1: First Reference Point, P2: Second Reference Point, P3: Third Reference Point, P4: Fourth Reference Point, Q1A to Q4B: Switching Device, QB1: First Reference Device, QB2: Second Reference Device, Q01: First Diagonal Device, Q02: Second Diagonal Device, Tsw: Switching Period, t1, t1a: First Diagonal ON Time, t2, t2a: Second Virtual Diagonal ON Time, t3, t3a: Third Diagonal ON Time, t4, t4a: Fourth Virtual Diagonal ON Time, td: Short Circuit Prevention Period

What is claimed is:

1. A DC/DC converter which performs bidirectional power transmission between a first DC power source and a second DC power source, the DC/DC converter comprising:
a transformer which performs power conversion between a first winding and a second winding;
a first converter which is provided with a first bridge circuit in which two of switching devices to each of which a diode is connected in inverse parallel are connected in series between a first positive electrode wire and a first negative electrode wire which are connected to the first DC power source, and a second bridge circuit in which two of the switching devices are connected in series between the first positive electrode wire and the first negative electrode wire; and in which a middle point of the first bridge circuit and a middle point of the second bridge circuit are connected to both terminals of the first winding, respectively;

a second converter which is provided with a third bridge circuit in which two of the switching devices are connected in series between a second positive electrode wire and a second negative electrode wire which are connected to the second DC power source, and a fourth bridge circuit in which two of the switching devices are connected in series between the second positive electrode wire and the second negative electrode wire; and in which a middle point of the third bridge circuit and a middle point of the fourth bridge circuit are connected to both terminals of the second winding, respectively;

one or both of a first reactor connected in series in connection path between the first converter and the first winding, and a second reactor connected in series in connection path between the second converter and the second winding; and a control circuit which performs on-off driving control of the switching devices of the first converter and the second converter, wherein by setting the switching device of either one of positive electrode side and negative electrode side in the first bridge circuit, to a first reference device, setting the switching device of an electrode side opposite to the first reference device in the second bridge circuit, to a first diagonal device, setting the switching device of either one of positive electrode side and negative electrode side in the third bridge circuit, to a second reference device, and setting the switching device of an electrode side opposite to the second reference device in the fourth bridge circuit, to a second diagonal device, in a case of performing a first power transmission which transmits electric power to the second DC power source from the first DC power source, the control circuit performs on-off driving control of the positive electrode side and the negative electrode side switching devices in each of the first bridge circuit, the second bridge circuit, and the fourth bridge circuit, and by setting a phase shift amount of on-off driving signal of the first diagonal device to on-off driving signal of the first reference device, to a first phase shift amount, and setting a phase shift amount of on-off driving signal of the second diagonal device to on-off driving signal of the first reference device, to a second phase shift amount, when the first transmission power amount transmitted to the second DC power source from the first DC power source is larger than a first reference point which is preliminarily set to a larger value than 0, the control circuit decreases the first phase shift amount and increases the second phase shift amount from the first phase shift amount and the second phase shift amount when the first transmission power amount is at the first reference point, as the first transmission power amount increases.

2. The DC/DC converter according to claim 1, wherein in a case of performing a second power transmission which transmits electric power to the first DC power source from the second DC power source, the control circuit performs on-off driving control of the positive electrode side and negative electrode side switching devices in each of the third bridge circuit, the fourth bridge circuit, and the second bridge circuit, and by setting a phase shift amount of on-off driving signal of the second diagonal device to on-off driving signal of the second reference device, to a third phase shift amount, and setting a phase shift amount of on-off driving signal of the first diagonal device to on-off driving signal of the second reference device, to a fourth phase shift amount, when the second transmission power amount transmitted to the first DC power source from the second DC power source is larger than a second reference point which is preliminarily set to a larger value than 0, the control circuit decreases the third phase shift amount and increases the fourth phase shift amount from the third phase shift amount and the fourth phase shift amount when the second transmission power amount is at the second reference point, as the second transmission power amount increases.

3. The DC/DC converter according to claim 2, wherein in a case of performing the first power transmission, when the first transmission power amount is between 0 and the first reference point, the control circuit decreases the first phase shift amount and the second phase shift amount while maintaining the first phase shift amount and the second phase shift amount in the same amount, as the first transmission power amount increases; and in a case of performing the second power transmission, when the second transmission power amount is between 0 and the second reference point, the control circuit decreases the third phase shift amount and the fourth phase shift amount while maintaining the third phase shift amount and the fourth phase shift amount in the same amount, as the second transmission power amount increases.

4. The DC/DC converter according to claim 2, wherein the first reference point is preliminarily set to the first transmission power amount in which the first phase shift amount and the second phase shift amount become 25% of a switching period for driving on/off of the switching device once; and the second reference point is preliminarily set to the second transmission power amount in which the third phase shift amount and the fourth phase shift amount become 25% of the switching period.

5. The DC/DC converter according to claim 2, wherein in a case of performing the first power transmission, when the first transmission power amount is between the first reference point and a third reference point which is preliminarily set to a larger value than the first reference point, the control circuit decreases the first phase shift amount and increases the second phase shift amount from the first phase shift amount and the second phase shift amount when the first transmission power amount is at the first reference point, as the first transmission power amount increases, and when the first transmission power amount is larger than the third reference point, the control circuit increases the second phase shift amount from the second phase shift amount when the first transmission power amount is at the third reference point, and maintains the first phase shift amount to the first phase shift amount when the first transmission power amount is at the third reference point, as the first transmission power amount increases; and in a case of performing the second power transmission, when the second transmission power amount is between the second reference point and a fourth reference point which is preliminarily set to a larger value than the second reference point, the control circuit decreases the third phase shift amount and increases the fourth phase shift amount from the third phase shift amount and the fourth phase shift amount when the second transmission power amount is at the second reference point, as the second transmission power amount increases, and when the second transmission power amount is larger than the fourth reference point, the control circuit increases the fourth phase shift amount from the fourth phase shift amount when the second transmission power amount is at the fourth reference point, and maintains the third phase shift amount to the third phase shift amount when the second transmission power amount is at the fourth reference point, as the second transmission power amount increases.

6. The DC/DC converter according to claim 5, wherein the first reference point is preliminarily set to the first transmission power amount in which the first phase shift amount and the second phase shift amount become a preliminarily set value which is smaller than 25% of a switching period for driving on/off of the switching device once, and the second reference point is preliminarily set to the second transmission power amount in which the third phase shift amount and the fourth phase shift amount become a preliminarily set value which is smaller than 25% of the switching period.

7. The DC/DC converter according to claim 2, wherein the control circuit calculates an output DUTY ratio based on the transmission power amount between the first DC power source and the second DC power source, and changes the first phase shift amount, the second phase shift amount, the third phase shift amount, and the fourth phase shift amount based on the output DUTY ratio.

* * * * *